US009207934B2

(12) United States Patent
Larimore et al.

(10) Patent No.: US 9,207,934 B2
(45) Date of Patent: Dec. 8, 2015

(54) METHOD AND SYSTEM FOR VIRTUALIZATION OF SOFTWARE APPLICATIONS

(71) Applicant: Code Systems Corporation, Seattle, WA (US)

(72) Inventors: Stefan I. Larimore, Redmond, WA (US); C. Michael Murphey, Seattle, WA (US); Kenji C. Obata, Seattle, WA (US)

(73) Assignee: CODE SYSTEMS CORPORATION, Seattle, WA (US)

( * ) Notice: Subject to any disclaimer, the term of this patent is extended or adjusted under 35 U.S.C. 154(b) by 0 days.

(21) Appl. No.: 13/866,682

(22) Filed: Apr. 19, 2013

(65) Prior Publication Data

US 2013/0247070 A1    Sep. 19, 2013

Related U.S. Application Data

(62) Division of application No. 12/188,161, filed on Aug. 7, 2008, now Pat. No. 8,434,093.

(51) Int. Cl.
*G06F 3/00* (2006.01)
*G06F 9/44* (2006.01)
*G06F 9/455* (2006.01)
*G06F 9/48* (2006.01)
*G06F 9/54* (2006.01)
(Continued)

(52) U.S. Cl.
CPC .............. *G06F 8/71* (2013.01); *G06F 9/44505* (2013.01); *G06F 9/455* (2013.01); *G06F 9/48* (2013.01); *G06F 9/544* (2013.01); *G06F 12/0813* (2013.01)

(58) Field of Classification Search
CPC .................................. G06F 9/44; G06F 11/22
USPC .......................................................... 719/328
See application file for complete search history.

(56) References Cited

U.S. PATENT DOCUMENTS 4,468,732 A    8/1984 Raver
5,437,031 A    7/1995 Kitami
(Continued)

OTHER PUBLICATIONS

Eugene Hung, Using Behavior Templates to design Remotely Executing Agents for wireless clients, 2004.*
(Continued)

*Primary Examiner* — Lechi Truong
(74) *Attorney, Agent, or Firm* — Davis Wright Tremaine LLP; Heather M. Colburn

(57) ABSTRACT

A method of virtualizing an application to execute on a plurality of operating systems without installation. The method includes creating an input configuration file for each operating system. The templates each include a collection of configurations that were made by the application during installation on a computing device executing the operating system. The templates are combined into a single application template having a layer including the collection of configurations for each operating system. The collection of configurations includes files and registry entries. The collections also identifies and configures environmental variables, systems, and the like. Files in the collection of configurations and references to those files may be replaced with references to files stored on installation media. The application template is used to build an executable of the virtualized application. The application template may be incorporated into a manifest listing other application templates and made available to users from a website.

7 Claims, 13 Drawing Sheets

(51) Int. Cl.
*G06F 9/445* (2006.01)
*G06F 12/08* (2006.01)

(56) References Cited

U.S. PATENT DOCUMENTS

| | | |
|---|---|---|
| 5,495,610 A | 2/1996 | Shing et al. |
| 5,860,068 A | 1/1999 | Cook |
| 5,987,590 A | 11/1999 | Wing So |
| 6,023,712 A | 2/2000 | Spear et al. |
| 6,263,363 B1 | 7/2001 | Rosenblatt et al. |
| 6,453,334 B1 | 9/2002 | Vinson et al. |
| 6,493,733 B1 | 12/2002 | Pollack et al. |
| 6,564,229 B1 | 5/2003 | Baweja et al. |
| 6,675,216 B1 | 1/2004 | Quatrano et al. |
| 6,704,808 B2 | 3/2004 | Kasamatsu et al. |
| 6,757,893 B1 | 6/2004 | Haikin |
| 7,028,295 B2 | 4/2006 | Li et al. |
| 7,064,760 B2 | 6/2006 | Capin et al. |
| 7,065,504 B2 | 6/2006 | Sakuma et al. |
| 7,076,768 B2 | 7/2006 | Li et al. |
| 7,089,259 B1 | 8/2006 | Kouznetsov et al. |
| 7,096,253 B2 | 8/2006 | Vinson et al. |
| 7,096,416 B1 | 8/2006 | Smith et al. |
| 7,117,495 B2 | 10/2006 | Blaser et al. |
| 7,130,073 B2 | 10/2006 | Kumar et al. |
| 7,162,036 B2 | 1/2007 | Rowe |
| 7,240,162 B2 | 7/2007 | De Vries |
| 7,246,351 B2 | 7/2007 | Bloch et al. |
| 7,272,613 B2 | 9/2007 | Sim et al. |
| 7,337,298 B2 | 2/2008 | Kawachiya et al. |
| 7,356,679 B1 | 4/2008 | Le et al. |
| 7,360,097 B2 | 4/2008 | Rothstein |
| 7,386,542 B2 | 6/2008 | Maybury et al. |
| 7,437,371 B2 | 10/2008 | Rathakrishnan et al. |
| 7,451,176 B2 | 11/2008 | Anders et al. |
| 7,451,196 B1 | 11/2008 | de Vries et al. |
| 7,499,991 B2 | 3/2009 | Johnson |
| 7,523,116 B2 | 4/2009 | Yan |
| 7,536,541 B2 | 5/2009 | Isaacson |
| 7,577,751 B2 | 8/2009 | Vinson et al. |
| 7,590,644 B2 | 9/2009 | Matsakis et al. |
| 7,600,097 B1 | 10/2009 | Wright |
| 7,607,127 B2 | 10/2009 | Romm et al. |
| 7,623,673 B2 | 11/2009 | Mercier |
| 7,634,477 B2 | 12/2009 | Hinshaw |
| 7,634,772 B2 | 12/2009 | Parthasarathy et al. |
| 7,664,367 B2 | 2/2010 | Suzuki |
| 7,669,189 B1 | 2/2010 | Umamageswaran |
| 7,689,825 B2 | 3/2010 | Iwamura |
| 7,707,564 B2 | 4/2010 | Marvin et al. |
| 7,743,407 B2 | 6/2010 | Sprigg et al. |
| 7,752,442 B2 | 7/2010 | Della-Libera et al. |
| 7,752,511 B2 | 7/2010 | Fulton et al. |
| 7,761,503 B2 | 7/2010 | Dhawan et al. |
| 7,797,748 B2 | 9/2010 | Zheng et al. |
| 7,801,827 B2 | 9/2010 | Bishop et al. |
| 7,831,047 B2 | 11/2010 | Rowe |
| 7,836,299 B2 | 11/2010 | England et al. |
| 7,840,961 B1 | 11/2010 | Weathersby |
| 7,950,026 B1 | 5/2011 | Urbach |
| 7,958,497 B1 | 6/2011 | Lindo et al. |
| 7,970,789 B1 | 6/2011 | Blaser et al. |
| 7,971,032 B2 | 6/2011 | Shattuck |
| 8,010,667 B2 | 8/2011 | Zhang et al. |
| 8,065,675 B2 | 11/2011 | Strauss et al. |
| 8,069,443 B2 | 11/2011 | Ackerman et al. |
| 8,219,805 B1 | 7/2012 | Ie et al. |
| 8,230,442 B2 | 7/2012 | Aho et al. |
| 8,271,944 B2 | 9/2012 | Austin et al. |
| 8,375,140 B2 | 2/2013 | Tippin et al. |
| 8,387,006 B1 | 2/2013 | Taylor |
| 8,429,248 B1 | 4/2013 | Ketrenos et al. |
| 8,434,093 B2 | 4/2013 | Larimore et al. |
| 8,468,175 B2 | 6/2013 | Obata |
| 8,489,513 B2 | 7/2013 | Bishop et al. |
| 8,510,734 B2 | 8/2013 | Criddle et al. |
| 8,677,345 B2 | 3/2014 | Choi et al. |
| 8,719,898 B1 | 5/2014 | Barton et al. |
| 8,745,601 B1 | 6/2014 | Carlson et al. |
| 8,763,009 B2 | 6/2014 | Degirmenci et al. |
| 2001/0016905 A1 | 8/2001 | Kasamatsu et al. |
| 2002/0029283 A1 | 3/2002 | Beckett et al. |
| 2002/0032754 A1 | 3/2002 | Logston et al. |
| 2002/0066085 A1 | 5/2002 | Nowlin Jr. et al. |
| 2002/0099951 A1 | 7/2002 | O'Connor |
| 2002/0112078 A1 | 8/2002 | Yach |
| 2002/0129129 A1 | 9/2002 | Bloch et al. |
| 2002/0133491 A1 | 9/2002 | Sim et al. |
| 2002/0161578 A1 | 10/2002 | Saidon et al. |
| 2002/0162015 A1 | 10/2002 | Tang |
| 2002/0174193 A1 | 11/2002 | Mikhalchuk |
| 2003/0031176 A1 | 2/2003 | Sim et al. |
| 2003/0051169 A1 | 3/2003 | Sprigg et al. |
| 2004/0083474 A1 | 4/2004 | McKinlay et al. |
| 2004/0128342 A1 | 7/2004 | Maes et al. |
| 2004/0133444 A1 | 7/2004 | Defaix et al. |
| 2004/0139315 A1 | 7/2004 | Tokutani et al. |
| 2005/0132359 A1 | 6/2005 | McGuire et al. |
| 2005/0198628 A1 | 9/2005 | Graham et al. |
| 2005/0198647 A1 | 9/2005 | Hipp et al. |
| 2005/0262553 A1 | 11/2005 | Bialick et al. |
| 2005/0273772 A1 | 12/2005 | Matsakis et al. |
| 2006/0048136 A1 | 3/2006 | Vries et al. |
| 2006/0053380 A1 | 3/2006 | Spataro et al. |
| 2006/0074733 A1 | 4/2006 | Shukla et al. |
| 2006/0075064 A1 | 4/2006 | Keohane et al. |
| 2006/0085359 A1 | 4/2006 | Kim |
| 2006/0123185 A1 | 6/2006 | de Vries et al. |
| 2006/0168294 A1 | 7/2006 | de Vries et al. |
| 2006/0218165 A1 | 9/2006 | Vries et al. |
| 2006/0222203 A1 | 10/2006 | Mercier |
| 2006/0230175 A1 | 10/2006 | de Vries et al. |
| 2006/0242626 A1 | 10/2006 | Pham et al. |
| 2006/0248442 A1 | 11/2006 | Rosenstein et al. |
| 2006/0253535 A1 | 11/2006 | Betros et al. |
| 2006/0256130 A1 | 11/2006 | Gonzalez |
| 2006/0259585 A1 | 11/2006 | Keohane et al. |
| 2007/0011672 A1 | 1/2007 | Bhide et al. |
| 2007/0016721 A1 | 1/2007 | Gay |
| 2007/0043943 A1 | 2/2007 | Peretti |
| 2007/0078988 A1 | 4/2007 | Miloushev et al. |
| 2007/0143704 A1 | 6/2007 | Laird-McConnell |
| 2007/0168953 A1 | 7/2007 | Diez et al. |
| 2007/0168965 A1 | 7/2007 | Zenz et al. |
| 2007/0174824 A1 | 7/2007 | Relyea et al. |
| 2007/0226798 A1 | 9/2007 | Sibert |
| 2007/0234277 A1 | 10/2007 | Lei et al. |
| 2007/0240155 A1 | 10/2007 | Shlomai |
| 2007/0245331 A1 | 10/2007 | Daynes et al. |
| 2007/0277102 A1 | 11/2007 | Kanzaki |
| 2007/0294674 A1 | 12/2007 | Marilly et al. |
| 2008/0010389 A1 | 1/2008 | Iwata |
| 2008/0155171 A1 | 6/2008 | Jeong |
| 2008/0163194 A1 | 7/2008 | Dias et al. |
| 2008/0181230 A1 | 7/2008 | Hitt et al. |
| 2008/0184135 A1 | 7/2008 | Washburn et al. |
| 2008/0235680 A1 | 9/2008 | Strauss |
| 2008/0275938 A1 | 11/2008 | Yach |
| 2008/0281882 A1 | 11/2008 | Hachio et al. |
| 2008/0294877 A1 | 11/2008 | Haga et al. |
| 2008/0298219 A1 | 12/2008 | Yamagata et al. |
| 2008/0301672 A1 | 12/2008 | Rao et al. |
| 2009/0055542 A1 | 2/2009 | Zhao et al. |
| 2009/0064086 A1 | 3/2009 | Faus et al. |
| 2009/0076966 A1 | 3/2009 | Bishop et al. |
| 2009/0077551 A1 | 3/2009 | Whiteley |
| 2009/0077645 A1 | 3/2009 | Kottahachchi |
| 2009/0110307 A1 | 4/2009 | Markowitz |
| 2009/0132811 A1 | 5/2009 | Koster et al. |
| 2009/0158432 A1 | 6/2009 | Zheng et al. |
| 2009/0193057 A1 | 7/2009 | Maes |
| 2009/0198358 A1 | 8/2009 | Logan et al. |
| 2009/0199175 A1 | 8/2009 | Keller et al. |
| 2009/0216811 A1 | 8/2009 | Manczak et al. |

(56) References Cited

U.S. PATENT DOCUMENTS

| | | | |
|---|---|---|---|
| 2009/0235158 | A1 | 9/2009 | Rosenstein et al. |
| 2009/0240663 | A1 | 9/2009 | Plattner et al. |
| 2009/0249071 | A1 | 10/2009 | De Atley et al. |
| 2009/0249324 | A1 | 10/2009 | Brar et al. |
| 2009/0300076 | A1 | 12/2009 | Friedman et al. |
| 2009/0300151 | A1 | 12/2009 | Friedman et al. |
| 2009/0307351 | A1 | 12/2009 | Raja et al. |
| 2009/0307763 | A1 | 12/2009 | Rawlins et al. |
| 2009/0313322 | A1 | 12/2009 | Sheehan et al. |
| 2009/0328030 | A1 | 12/2009 | Fries |
| 2010/0005291 | A1 | 1/2010 | Hulten et al. |
| 2010/0023640 | A1 | 1/2010 | Vinson et al. |
| 2010/0023934 | A1 | 1/2010 | Sheehan et al. |
| 2010/0023974 | A1 | 1/2010 | Shiragaki et al. |
| 2010/0037206 | A1 | 2/2010 | Larimore et al. |
| 2010/0037235 | A1 | 2/2010 | Larimore et al. |
| 2010/0077096 | A1 | 3/2010 | Philip et al. |
| 2010/0088448 | A1 | 4/2010 | Min et al. |
| 2010/0106804 | A1 | 4/2010 | He et al. |
| 2010/0107163 | A1 | 4/2010 | Lee |
| 2010/0121973 | A1 | 5/2010 | Lobacheva et al. |
| 2010/0131084 | A1 | 5/2010 | Van camp |
| 2010/0138479 | A1 | 6/2010 | Zhu |
| 2010/0146590 | A1 | 6/2010 | Jung |
| 2010/0169790 | A1 | 7/2010 | Vaughan et al. |
| 2010/0205604 | A1 | 8/2010 | Brower et al. |
| 2010/0241718 | A1 | 9/2010 | Rasmussen et al. |
| 2010/0250782 | A1 | 9/2010 | Pratt et al. |
| 2010/0281458 | A1 | 11/2010 | Paladino et al. |
| 2010/0306849 | A1 | 12/2010 | Zheng et al. |
| 2010/0318997 | A1 | 12/2010 | Li et al. |
| 2010/0322523 | A1 | 12/2010 | Mitsuhashi et al. |
| 2010/0333085 | A1 | 12/2010 | Criddle et al. |
| 2011/0004840 | A1 | 1/2011 | Feinberg et al. |
| 2011/0078625 | A1 | 3/2011 | Mumford et al. |
| 2011/0106908 | A1 | 5/2011 | Risku et al. |
| 2011/0145428 | A1 | 6/2011 | Wei et al. |
| 2011/0145592 | A1 | 6/2011 | Greiner |
| 2011/0145726 | A1 | 6/2011 | Wei et al. |
| 2011/0153437 | A1 | 6/2011 | Archer et al. |
| 2011/0153975 | A1 | 6/2011 | Accapadi et al. |
| 2011/0173607 | A1 | 7/2011 | Murphey et al. |
| 2011/0179411 | A1 | 7/2011 | Lederer |
| 2011/0185013 | A1 | 7/2011 | Obata et al. |
| 2011/0185043 | A1 | 7/2011 | Zeller et al. |
| 2011/0191772 | A1 | 8/2011 | Larimore et al. |
| 2011/0246659 | A1 | 10/2011 | Bouazizi |
| 2011/0289513 | A1 | 11/2011 | Degirmenci et al. |
| 2012/0005237 | A1 | 1/2012 | Obata |
| 2012/0005244 | A1 | 1/2012 | Obata et al. |
| 2012/0005246 | A1 | 1/2012 | Obata |
| 2012/0005309 | A1 | 1/2012 | Obata et al. |
| 2012/0005310 | A1 | 1/2012 | Obata |
| 2012/0005334 | A1 | 1/2012 | Raja et al. |
| 2012/0005674 | A1 | 1/2012 | Larimore et al. |
| 2012/0096071 | A1 | 4/2012 | Murphey et al. |
| 2012/0110337 | A1 | 5/2012 | Murphey et al. |
| 2012/0125993 | A1 | 5/2012 | Thiele et al. |
| 2012/0150986 | A1 | 6/2012 | Piccinini et al. |
| 2012/0155358 | A1 | 6/2012 | Hao et al. |
| 2012/0203807 | A1 | 8/2012 | Larimore et al. |
| 2012/0203808 | A1 | 8/2012 | Larimore et al. |
| 2013/0086386 | A1 | 4/2013 | Murphey et al. |
| 2013/0132525 | A1 | 5/2013 | Tippin |
| 2013/0139250 | A1 | 5/2013 | Lo et al. |
| 2013/0191882 | A1 | 7/2013 | Jolfaei |
| 2013/0247070 | A1 | 9/2013 | Larimore et al. |
| 2013/0271456 | A1 | 10/2013 | Haswell et al. |
| 2013/0275886 | A1 | 10/2013 | Haswell et al. |
| 2013/0283362 | A1 | 10/2013 | Kress et al. |
| 2014/0298401 | A1 | 10/2014 | Batson et al. |

OTHER PUBLICATIONS

Non-Final Office Action issued in U.S. Appl. No. 13/171,258, dated Apr. 29, 2014.

Notice of Allowance issued in U.S. Appl. No. 13/449,049, dated Apr. 29, 2013.

Non-Final Office Action issued in U.S. Appl. No. 13/449,049, dated Dec. 13, 2012.

Notice of Allowance issued in U.S. Appl. No. 13/449,049, dated Aug. 13, 2013.

Final Office Action issued in U.S. Appl. No. 13/449,140, dated Jul. 22, 2013.

Non-Final Office Action issued in U.S. Appl. No. 13/449,140, dated Dec. 7, 2012.

Non-Final Rejection issued in U.S. Appl. No. 13/449,140, dated Nov. 15, 2013.

Non-Final Office Action issued in U.S. Appl. No. 13/683,969, dated Feb. 28, 2014.

Non-Final Office Action issued in U.S. Appl. No. 13/918,067, dated Feb. 27, 2014.

Chapin, John, "Hive: Operating System Fault Containment for Shared-Memory Multiprocessors," Technical Report No. CSL-TR-97-712, Computer Systems laboratory, Departments of Electrical Engineering and Computer Science, Stanford University, 156 pages, Jul. 1997.

Susitaival, et al., "Anaylizing the File Availability and Download Time in a P2P File Sharing System," IEEE, 2007, pp. 88-95.

Thinstall, "Application Virtualization: A Technical Overview of the Thinstall Application Virtualization Platform" Nov. 26, 2006.

Notice of Allowance issued in U.S. Appl. No. 12/188,155, dated Feb. 23, 2014.

Notice of Allowance issued in U.S. Appl. No. 12/188,155, dated Jun. 25, 2013.

Non-Final Office Action issued in U.S. Appl. No. 12/188,155, dated Dec. 19, 2011.

Final Office Action issued in U.S. Appl. No. 12/188,155, dated Aug. 31, 2012.

Non-Final Office Action issued in U.S. Appl. No. 12/188,155, dated Feb. 28, 2013.

Notice of Allowance issue in U.S. Appl. No. 12/188,155, dated Oct. 25, 2013.

Notice of Allowance issued in U.S. Appl. No. 12/188,161, dated Jan. 4, 2013.

Restriction Requirement issued in U.S. Appl. No. 12/188,161, dated Dec. 20, 2011.

Non-Final Office Action issued in U.S. Appl. No. 12/188,161, dated May 10, 2012.

Notice of Allowance issue in U.S. Appl. No. 12/188,161, dated Oct. 10, 2012.

Notice of Allowance issued in U.S. Appl. No. 12/188,161, dated Dec. 4, 2012.

Non-Final Office Action issued in U.S. Appl. No. 12/685,576, dated Jun. 20, 2013.

Non-Final Office Action, issued in U.S. Appl. No. 12/685,576, dated Nov. 2, 2012.

Final Office Action issued in U.S. Appl. No. 12/685,576, dated Jan. 30, 2014.

Non-Final Office Action, issued in U.S. Appl. No. 12/695,107, dated Dec. 8, 2011.

Final Office Action issued in U.S. Appl. No. 12/695,107, dated Oct. 30, 2012.

Notice of Allowance issued in U.S. Appl. No. 12/697,029, dated May 24, 2013.

Notice of Allowance issued in U.S. Appl. No. 12/697,029, dated Aug. 17, 2012.

Restriction Requirement issued in U.S. Appl. No. 12/705,492, dated Mar. 15, 2013.

Notice of Allowance issued in U.S. Appl. No. 12/876,082, dated Feb. 28, 2014.

Non-Final Office Action issued in U.S. Appl. No. 12/876,082, dated Oct. 22, 2012.

Notice of Allowance issued in U.S. Appl. No. 12/876,082, Dated May 10, 2013.

Non-Final Office Action issued in U.S. Appl. No. 12/876,085, dated Mar. 18, 2013.

Restriction Requirement issued in U.S. Appl. No. 12/876,085, dated Jan. 27, 2012.

(56) References Cited

OTHER PUBLICATIONS

Non-Final Office Action issued in U.S. Appl. No. 12/876,085, dated Mar. 8, 2012.
Final Office Action issued in U.S. Appl. No. 12/876,085, dated Nov. 14, 2012.
Notice of Allowance issued in U.S. Appl. No. 12/876,085 dated Mar. 6, 2014.
Notice of Allowance issued in U.S. Appl. No. 12/876,085, dated Nov. 14, 2013.
Notice of Allowance issued in U.S. Appl. No. 12/877,918, dated Apr. 26, 2013.
Notice of Allowance issued in U.S. Appl. No. 12/877,918, dated Mar. 19, 2012.
Notice of Allowance issued in U.S. Appl. No. 12/877,918, dated Jun. 21, 2012.
Notice of Allowance issued in U.S. Appl. No. 12/877,918, dated Aug. 16, 2012.
Notice of Allowance issued in U.S. Appl. No. 12/877,918, dated Sep. 26, 2012.
Notice of Allowance issued in U.S. Appl. No. 12/877,918, dated Dec. 13, 2013.
Notice of Allowance issued in U.S. Appl. No. 12/877,918, dated Aug. 20, 2013.
Non Final Office Action issued in U.S. Appl. No. 12/879,947, dated Jul. 10, 2013.
Notice of Allowance issued in U.S. Appl. No. 12/879,947, dated Jan. 27, 2014.
Non-Final Office Action issued in U.S. Appl. No. 12/879,956, dated Jun. 6, 2012.
Notice of Allowance issued in U.S. Appl. No. 12/879,956, dated Feb. 21, 2013.
Final Office Action issued in U.S. Appl. No. 12/879,956, dated Nov. 23, 2012.
Non-Final Office Action issued in U.S. Appl. No. 12/906,904, dated Nov. 13, 2012.
Final Rejection issued in U.S. Appl. No. 12/906,904, dated Jul. 31, 2013.
Final Office Action issued in U.S. Appl. No. 12/916,348, dated Jul. 11, 2013.
Non-Final Office Action issued in U.S. Appl. No. 12/916,348, dated Oct. 24, 2012.
Notice of Allowance issued in U.S. Appl. No. 12/916,348, dated Nov. 13, 2013.
Notice of Allowance issued in U.S. Appl. No. 13/088,265, dated Feb. 14, 2014.
Final Office Action issued in U.S. Appl. No. 13/088,265, dated Jul. 25, 2013.
Non-Final Office Action issued in U.S. Appl. No. 13/088,265, dated Dec. 12, 2012.
Final Office Action issued in U.S. Appl. No. 13/171,258, dated Jan. 11, 2013.
Non-Final Office Action issued in U.S. Appl. No. 13/171,258, dated Jul. 13, 2012.
Restriction Requirement issued in U.S. Appl. No. 12/705,492, dated Aug. 6, 2014.
Notice of Allowance issued in U.S. Appl. No. 13/449,140, dated on Aug. 11, 2014.
Non-Final Office Action issued in U.S. Appl. No. 12/916,348, dated Sep. 4, 2014.
Notice of Allowance issued in U.S. Appl. No. 12/695,107, dated Sep. 17, 2014.
Notice of Allowance issued in U.S. Appl. No. 12/685,576, dated Sep. 23, 2014.
Notice of Allowance issued in U.S. Appl. No. 12/705,492 on Sep. 26, 2014.
Of Allowance issued in U.S. Appl. No. 12/876,082 on Sep. 26, 2014.
Notice of Allowance issued in U.S. Appl. No. 12/697,029 on Oct. 3, 2014.
Notice of Allowance issued in U.S. Appl. No. 12/906,904 on Oct. 8, 2014.
Non-Final Office Action issued in U.S. Appl. No. 14/297,506, on Nov. 6, 2014.
Non-Final Office Action issued in U.S. Appl. No. 13/683,969, on Nov. 14, 2014.
Notice of Allowance issued in U.S. Appl. No. 13/918,067 on Nov. 17, 2014.
Pei Zheng and Chen Wang; "SODON:A High Availability Multi-Source Content Distribution Overlay"; 2004; IEEE.
Notice of Allowance received in U.S. Appl. No. 12/705,492, dated Oct. 31, 2014.
Notice of Allowance received in U.S. Appl. No. 13/449,140, dated Nov. 20, 2014.
Notice of Allowance received in U.S. Appl. No. 12/695,107, dated Jan. 5, 2015.
Final Office Action received in U.S. Appl. No. 13/171,258, dated Jan. 23, 2015.
Notice of Allowance received in U.S. Appl. No. 12/697,029, dated Jan. 30, 2015.
Notice of Allowance received in U.S. Appl. No. 13/683,969, dated Feb. 4, 2015.
Notice of Allowance received in U.S. Appl. No. 12/876,082, dated Feb. 20, 2015.
Non-Final Office Action received in U.S. Appl. No. 14/297,468, dated Feb. 26, 2015.
Notice of Allowance received in U.S. Appl. No. 13/918,067, dated Mar. 2, 2015.
Notice of Allowance received in U.S. Appl. No. 12/695,107, dated Mar. 19, 2015.
Notice of Allowance received in U.S. Appl. No. 12/916,348 , dated Mar. 23, 2015.
Notice of Allowance received in U.S. Appl. No. 13/683,969, dated Apr. 2, 2015.
Non-Final Office Action received in U.S. Appl. No. 14/262,511, dated Apr. 27, 2015.
Information Disclosure Statement Transmittal Letter filed herewith.
Final Office Action, mailed in U.S. Appl. No. 14/297,468 on Oct. 16, 2015.

* cited by examiner

```
                                                            ┌─ 200
┌─────────────────────────────────────────────────────┐
│  - Configuration.xappl ◄─                           │
│  - \Files (optional)      ── 202                    │
│      ○    \@PROGRAMFILES@                           │
│              *   \Acme  ◄─                          │
│                     *   \Application   ── 204       │
│                            ○  App.exe ◄─            │
│                            ○  AppConfig.xml ── 160  │
│      ○    \@APPDATA@                                │
│              *   ...                                │
│  - Custom code plug-in (optional) ◄─                │
│                                         ── 206      │
└─────────────────────────────────────────────────────┘
```

FIGURE 4

```
                                                            ┌─ 202
┌─────────────────────────────────────────────────────┐
│ <?xml version="1.0" encoding="utf-16"?>             │
│ <Xenocode Version="6.0.236">                        │
│   <VirtualMachine>                                  │
│     <Cab ID="1" Path="Media\FilesA.CAB" />          │
│     <Cab ID="2" Path="Media\FilesB.CAB" />          │
│     <VirtualLayers>           ┌─ 208A               │
│       <VirtualLayer Name="Default"> ◄─              │
│         <VirtualFilesystem>                         │
│           <Directory RootType="Application" Behavior="Merge" /> │
│             <File Name="App.EXE"                    │
│             Hide="False"                            │
│             CabName=" App.EXE_1033"                 │
│             CabID="1"  />                           │
│             <File Name="App.DLL"                    │
│             Hide="False"                            │
│             CabName=" App.DLL_1033"                 │
│             CabID="1"  />    ┌─ 205                 │
│             <File Name="App2.DLL" ◄─                │
│             Hide="False"                            │
│             Source=".\Files\Default\System\App2.DLL" /> │
│     ...                                             │
│       <VirtualLayer Name="Win2k"> ◄── 208B          │
│         <Condition Variable="OS" Operator="Equal" Value="Win2k" /> │
│             ...                                     │
└─────────────────────────────────────────────────────┘
```

FIGURE 5

```
<?xml version="1.0" encoding="UTF-8" standalone="yes"?>
<assembly
        xmlns="urn:schemas-microsoft-com:asm.v1"
        manifestVersion="1.0">
    <noInheritable></noInheritable>
    <assemblyIdentity
            type="win32"
            name="Microsoft.VC80.CRT"
            version="8.0.50727.42"
            processorArchitecture="x86"
            publicKeyToken="1fc8b3b9a1e18e3b">
    </assemblyIdentity>
    <file name="msvcr80.dll" />
    <file name="msvcp80.dll" />
    <file name="msvcm80.dll" />
</assembly>
```
⟵ 680

FIGURE 11

```
<?xml version="1.0" encoding="UTF-8" standalone="yes"?>
<assembly
        xmlns="urn:schemas-microsoft-com:asm.v1"
        manifestVersion="1.0">
    <assemblyIdentity
            version="1.0.0.0"
            processorArchitecture="X86"
            name="SampleApp"
            type="win32" >
    </assemblyIdentity>
    <dependency>
        <dependentAssembly>
            <assemblyIdentity
                    type="win32"
                    name="Microsoft.VC80.CRT"
                    version="8.0.50727.42"
                    processorArchitecture="x86"
                    publicKeyToken="1fc8b3b9a1e18e3b">
            </assemblyIdentity>
        </dependentAssembly>
    </dependency>
</assembly>
```
⟵ 690

FIGURE 12

```
<?xml version="1.0" encoding="UTF-8" standalone="yes"?>
<assembly
        xmlns="urn:schemas-microsoft-com:asm.v1"
        manifestVersion="1.0">
    <noInheritable></noInheritable>
    <assemblyIdentity
            type="win32"
            name="Microsoft.VC80.CRT@8.0.50727.42"
            version="8.0.50727.42"
            processorArchitecture="x86" >
    </assemblyIdentity>
    <file name="msvcr80.dll" />
    <file name="msvcp80.dll" />
    <file name="msvcm80.dll" />
</assembly>
```
⌒ 680

FIGURE 13

```
<?xml version="1.0" encoding="UTF-8" standalone="yes"?>
<assembly
        xmlns="urn:schemas-microsoft-com:asm.v1"
        manifestVersion="1.0">
    <assemblyIdentity
            version="1.0.0.0"
            processorArchitecture="X86"
            name="SampleApp"
            type="win32" >
    </assemblyIdentity>
    <dependency>
        <dependentAssembly>
            <assemblyIdentity
                    type="win32"
                    name="Microsoft.VC80.CRT@8.0.50727.42"
                    version="8.0.50727.42"
                    processorArchitecture="x86" >
            </assemblyIdentity>
        </dependentAssembly>
    </dependency>
</assembly>
```
⌒ 690

FIGURE 14

| Folder Replacement | Typical path on English Windows XP machine |
| --- | --- |
| @WINDIR@ | c:\Windows |
| @PROGRAMFILES@ | c:\Program Files |
| @PROGRAMFILESCOMMON@ | c:\Program Files\Common |
| @SYSTEM@ | c:\Windows\System32 |
| @APPDATALOCAL@ | c:\Documents and Settings\username\Local Settings\Application |
| @APPDATA@ | c:\Documents and Settings\username\Application Data |
| @STARTUP@ | c:\Documents and Settings\username\Start Menu\Programs\Startup |
| @PROGRAMS@ | c:\Documents and Settings\username\Start Menu\Programs |
| @STARTMENU@ | c:\Documents and Settings\username\Start Menu |
| @DESKTOP@ | c:\Documents and Settings\username\Desktop |
| @TEMPLATES@ | c:\Documents and Settings\username\Templates |
| @FAVORITES@ | c:\Documents and Settings\username\Favorites |
| @DOCUMENTS@ | c:\Documents and Settings\username\My Documents |
| @MUSIC@ | c:\Documents and Settings\username\My Documents\My Music |
| @PICTURES@ | c:\Documents and Settings\username\My Documents\My Pictures |
| @PROFILE@ | c:\Documents and Settings\username |
| @APPDATACOMMON@ | c:\Documents and Settings\All Users\Application Data |
| @STARTUPCOMMON@ | c:\Documents and Settings\All Users\Start |
| @PROGRAMSCOMMON@ | c:\Documents and Settings\All Users\Start Menu\Programs |
| @STARTMENUCOMMON@ | c:\Documents and Settings\All Users\Start Menu |
| @DESKTOPCOMMON@ | c:\Documents and Settings\All Users\Desktop |
| @TEMPLATESCOMMON@ | c:\Documents and Settings\All Users\Templates |
| @FAVORITESCOMMON@ | c:\Documents and Settings\All Users\Favorites |
| @DOCUMENTSCOMMON@ | c:\Documents and Settings\All Users\Documents |
| @MUSICCOMMON@ | c:\Documents and Settings\All Users\Documents\My Music |
| @PICTURESCOMMON@ | c:\Documents and Settings\All Users\Documents\My Pictures |
| @PROFILECOMMON@ | c:\Documents and Settings\All Users |

FIGURE 15

METHOD AND SYSTEM FOR VIRTUALIZATION OF SOFTWARE APPLICATIONS

BACKGROUND OF THE INVENTION

1. Field of the Invention

The present invention is directed generally to methods of virtualizing an application so that when the application is executed on a computing device having an operating system, the application is at least partially isolated from the operating system and executes on the computing device without having been installed or having administrator privileges.

2. Description of the Related Art

Installation of a typical application on a computing device usually requires a long setup and configuration process, which includes copying files, registering software components, installing runtimes, installing third-party components upon which the application is dependent, configuring setup files, and so forth. Additionally, user configuration including setting up user preferences, and other customization is also typically required.

Further, more than one application is typically installed on the computing device. Interactions between shared components and different versions of the same application frequently introduce errors when applications are installed, uninstalled, or upgraded.

Within an organization, applications are typically installed by Information Technology ("IT") personnel and systems administrators. To protect information stored on networked computing devices, it may be desirable to configure the organization's computing devices with security measures. Unfortunately, many applications do not function properly on secured, locked-down desktops. Thus, IT personnel and systems administrators may be forced by the needs of the organization to compromise network security for application compatibility.

One method of deploying (installing and executing) an application that avoids these above problems includes preparing and executing a virtualized copy of the application (a "virtual application"). A virtual application is a virtual machine image pre-configured with all of the files, registry data, settings, components, runtimes, and other dependencies required for a specific application to execute immediately and without installation on the host computing device. Virtual applications allow application publishers and IT administrators to reduce the costs and complexity associated with development, setup, configuration, deployment, and maintenance of software applications.

For example, a publisher of an application based on the Microsoft .NET Framework or Java runtime engine might create a virtual application that combines the application with the required runtime engine. Using this virtual application, an end-user can run the application immediately, even if the user has not installed the required runtime engine, or has an incompatible runtime engine installed. This improves both the user experience and reduces both test and support complexity associated with deployment of the application.

Furthermore, because each virtual application is an isolated execution environment, virtual applications may be concurrently executed that would otherwise interfere with one another. For example, applications that overwrite system DLLs or require different runtime engine versions can be executed simultaneously on a single host computing device. As an additional advantage, virtual applications can provide access to internal virtualized copies of privileged system resources, allowing unprivileged users to execute applications without encountering security exceptions or irritating Vista User Account Control ("UAC") prompts.

Therefore, a need exists for methods and systems for preparing virtualized applications. A further need exists for a method of allowing an end user to build and configure the virtualized application. A virtual application configured to effectively share memory between processes is also desirable. The present application provides these and other advantages as will be apparent from the following detailed description and accompanying figures.

BRIEF DESCRIPTION OF THE SEVERAL VIEWS OF THE DRAWING(S)

FIG. 1 is an illustration of a system for creating an application template from which a virtualized application may be constructed.

FIG. 2 is a diagram of a hardware environment and an operating environment in which the computing devices of the system of FIG. 1 may be implemented FIG. 3 is an illustration of a conceptualization of software components stored in the memory of and executing on a host computing device of the system of FIG. 1, the software components include a virtualized application executing within a virtual operating system, which is executing within a host operating system.

FIG. 4 is an example of an application template created by system of FIG. 1.

FIG. 5 is an example of a configuration file of the application template of FIG. 4.

FIG. 11 is an example of an assembly manifest of a Microsoft Side-by-Side ("SxS") assembly installed in the operation system of the host computing device.

FIG. 12 is an example of an application manifest referencing the assembly manifest of FIG. 11.

FIG. 13 is a privatized version of the assembly manifest of FIG. 11.

FIG. 14 is a privatized version of the application manifest of FIG. 13

FIG. 15 is a table mapping examples of special folders found in some Microsoft Window operating systems to corresponding folders used in the filesystem configuration portion of the application template.

DETAILED DESCRIPTION OF THE INVENTION

System Overview

Figure 1:
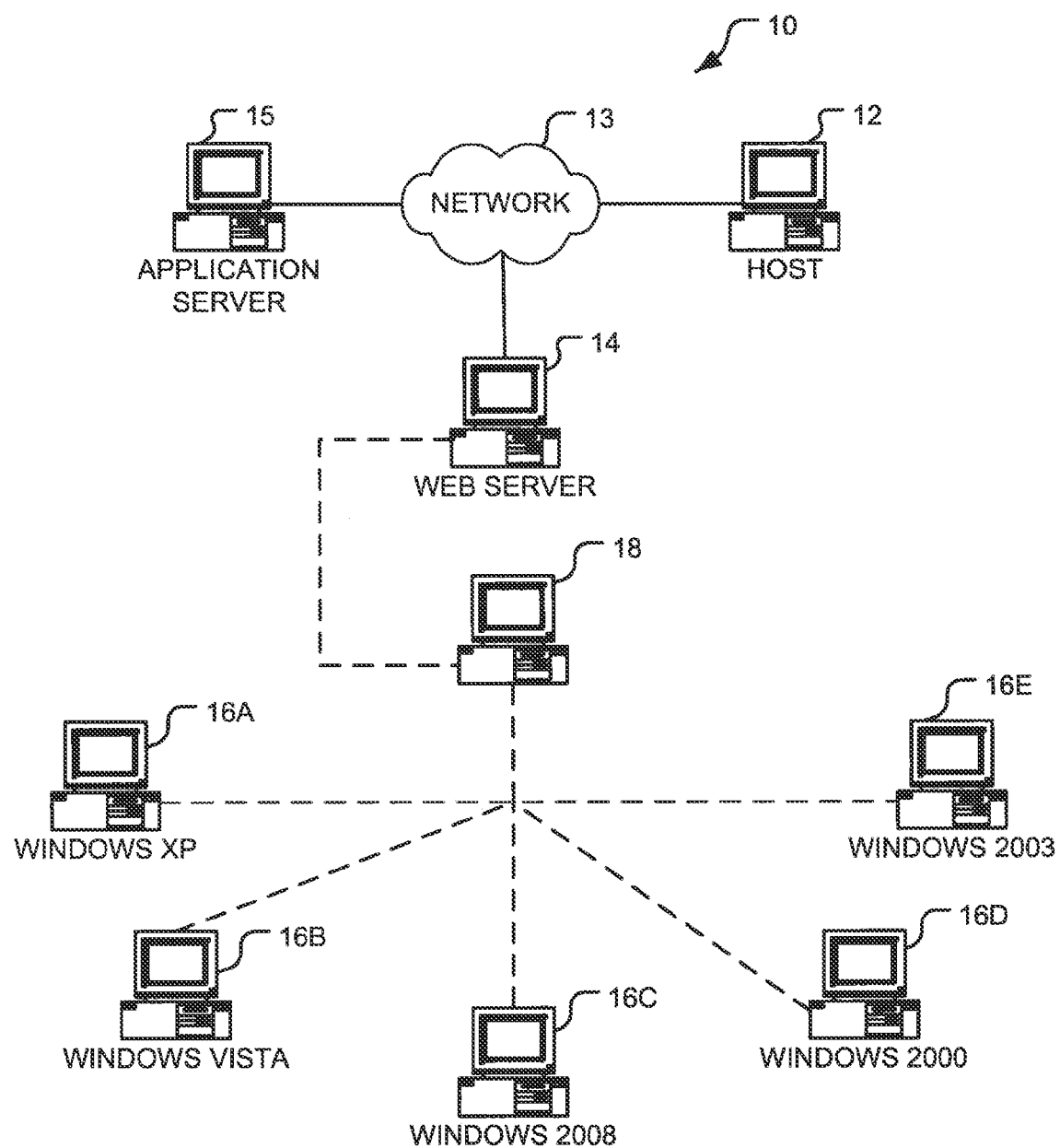

Referring to FIG. 1, aspects of the present invention relate to a system 10 for virtualizing one or more user applications. Once virtualized, an application may be deployed in a preconfigured, single-executable file (a "virtualized application executable") configured to execute instantly (i.e., without installation) on any computing device. Particular implementations described below are configured to execute instantly on any computing device executing a Microsoft Windows operating system.

The system 10 includes a host computing device 12 operated by an end user. The host computing device 12 executes the virtualized application executable and is optionally coupled to a network 13, such as a LAN, WAN, corporate Intranet, the Internet, a combination thereof, and the like. The virtualized application executable may be simply copied to the hard drive or other internal memory of the host computing device 12 and executed from that location. Alternatively, the virtualized application executable may be deployed from another computing device, such as an application server 15, over the network 13, or from external memory, such as a USB keys (or flash drives). By way of another example, the virtualized application executable may be deployed from existing infrastructure such as Microsoft SMS, LANDesk, Altiris, ZENWorks, Unicenter, AppStream, and the like.

For IT administrators, system integrators, software publishers, and the like, deploying an application using a virtualized application executable may reduce the costs and complexity associated with development, setup, configuration, deployment, and maintenance of software applications and the deployment of legacy applications on newer operating systems, such as Windows Vista.

As explained below, the host computing device 12 may be used to construct or build the virtualized application from an application template. A server 14, such as a web server, is also optionally coupled to the network 13. The host computing device 12 may receive the application template from the server 14 over the network 13.

The application template may be constructed using a plurality of computing devices 16A-16E, each executing a different operating system or otherwise offering a different computing environment. Each of the computing devices 16A-16E may be used to construct an input configuration file specific to the computing environment of that computing device. Optionally, the input configuration files may be transferred to another computing device 18 that combines the input configuration files into a single application template. Optionally, the computing devices 16A-16E may be coupled together and/or coupled to the computing device 18 using any suitable method known in the art. Further, the computing device 18 may be coupled to the server 14. However, this is not a requirement.

Figure 2:
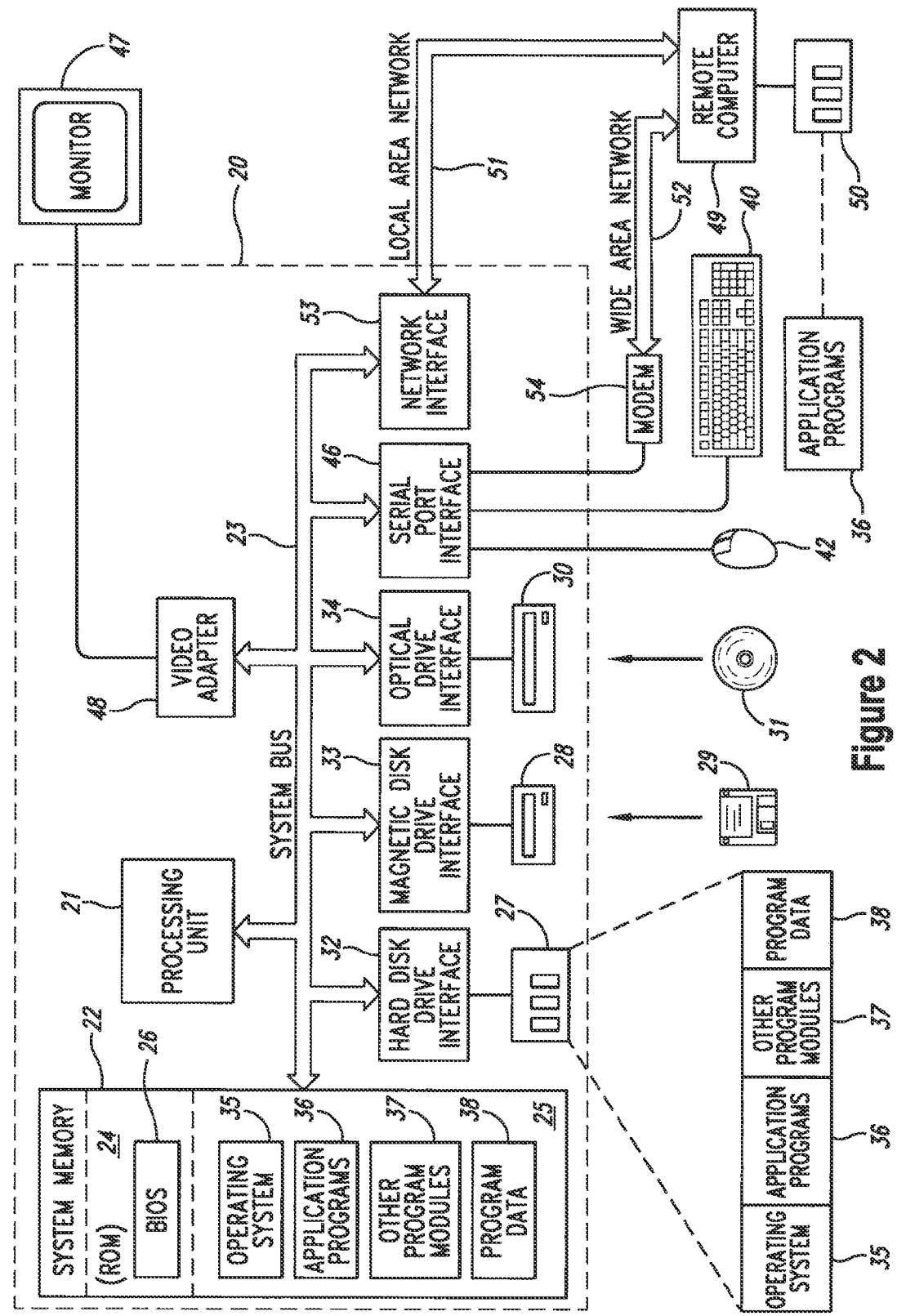

FIG. 2 is a diagram of hardware and an operating environment in conjunction with which implementations of the system 10 may be practiced. The description of FIG. 2 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 2 includes a general-purpose computing device in the form of a computer 20. Each of the host computing device 12, the server 14, the application server 15, the computing devices 16A-16E, and the computing device 18 may be implemented using the computer 20.

The computer 20 includes a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20 (as the local computer). Implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 2. The logical connections depicted in FIG. 2 include a local-area network (LAN) 51 and a wide-area network (WAN) 52. Such networking environments are commonplace in offices, enterprise-wide computer networks, intranets and the Internet. As mentioned above, the network 13 may include any of these networking environments.

When used in a LAN-networking environment, the computer 20 is connected to the local area network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device 50. It is appreciated that the network connections shown are exemplary and other means of and communications devices for establishing a communications link between the computers may be used.

The computing device 20 and related components have been presented herein by way of particular example and also by abstraction in order to facilitate a high-level view of the concepts disclosed. The actual technical design and implementation may vary based on particular implementation while maintaining the overall nature of the concepts disclosed.

Figure 3:
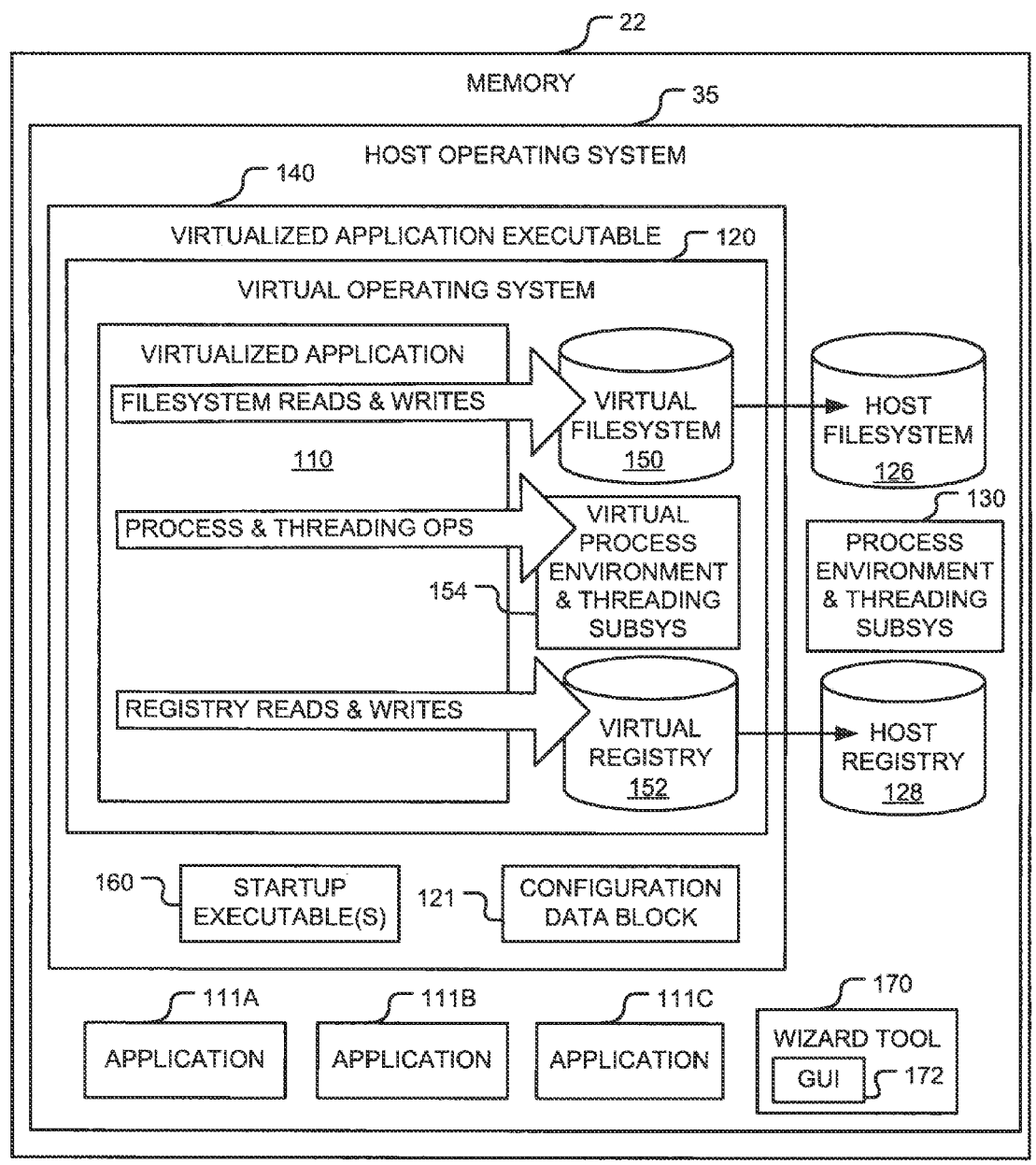

FIG. 3 illustrates the system memory 22 of the host computing device 12. As discussed above, application virtualization involves isolating a virtualized application 110 from other applications 111A-111C and at least partially isolating the virtualized application 110 from the underlying host operating system 35 installed and executing on the host computing device 12 on which the virtualized application is also executing. By way of non-limiting examples, the virtualized application 110 may be configured to execute in one or more of the following computing environments: Windows, .NET, Java, Flash, Shockwave, combinations thereof, and the like.

Using methods described below, the system 10 produces a virtualized application executable 140 configured to execute the virtualized application 110 on the host computing device 12 without installation on the host computing device 12. The virtualized application executable 140 includes both the virtualized application 110 and a virtual operating system 120. When the virtualized application 110 is executed in the virtual operating system 120, the virtual operating system 120 provides a virtualization runtime for the virtualized application 110.

As is apparent to those of ordinary skill, a natively installed application may include multiple application files. A native installed executables is installed directly on the host computing device 12. The virtualized application executable 140 includes blocks of data corresponding to each of the application files of a natively installed version of the application. The virtualized application executable 140 also includes a configuration data block 121 corresponding to a configuration file. When the virtualized application executable 140 is executed, the configuration data block 121 configures the virtual operating system 120 to execute the virtualized application 110. For example, the configuration data block 121 contains configuration information related to application files, registry entries, environment variables, services, and the like. The virtual operating system 120 is configured to communicate with the host operating system 35 as required to execute the virtualized application 110 on the host computing device 12.

Unlike traditional deployment methods, the virtualized application executable 140 does not require setup for external components or runtimes (e.g., virtual machines configured to manage applications while they are executing). Further, because the virtualized application executable 140 is not installed on the host computing device 12, running or executing the virtualized application 110 does not require a reboot of the host computing device 12 or administrative privileges on the device. The virtualized application executable 140 also does not execute within another application, such as a player application.

During execution, the virtualized application 110 executes within the virtual operating system 120, which is itself executing on the host operating system 35 installed on the host computing device 12. The virtualized application 110 is isolated from other applications 111A-111C, preventing DLL conflicts and other deployment related issues. The virtualized application executable 140 may be a 32-bit executable that can execute on in 32-bit mode on x64 platforms. The virtual operating system 120 may be configured to support common runtime environments, such as the .NET Framework (versions 1.1, 2.0, 3.0, and 3.5), Java (versions 5.0 and 6.0), Flash, Shockwave, and the like. A runtime environment is a virtual machine that provides software services to applications.

As is appreciated by those of ordinary skill in the art, the host operating system 35, like most operating systems, includes a host filesystem 126, a host registry 128, and a process environment and threading subsystems component 130.

The virtual operating system 120 includes a virtual filesystem 150, virtual registry 152, and a virtual process environment and threading subsystems component 154. These components of the virtual operating system 120 are embedded within the virtualized application executable 140, allowing the virtualized application to be executed on the host computing device 12. The virtual filesystem 150, virtual registry 152, and a virtual process environment and threading subsystems component 154 may be implemented as a lightweight implementation of core Windows operating system APIs, including the filesystem, registry, process environment, and threading subsystems, completely implemented within the Windows user-mode space. In other words, the virtual operating system 120 virtualizes user-mode operating system features. In particular embodiments, the virtual operating system 120 may be configured to interact with one or more of the following operating systems produced by Microsoft Corporation: Windows XP, Windows 2000 and later versions, Windows Server, and/or Windows Vista operating systems.

In particular embodiments, the virtual operating system 120 may not emulate all or a portion of the operating system stack (not shown). In such embodiments, applications requiring device drivers or other non-user-mode software may require a hardware-virtualized environment to function properly.

Applications executing within the virtual operating system 120 interact with the virtual filesystem 150, virtual registry 152, and virtual process environment and threading subsystems component 154, rather than with the host filesystem 126, the host registry 128, and the process environment and threading subsystems component 130 of the host operating system 35. The virtual operating system 120 handles requests within the virtualized environment internally or, when appropriate, routes requests to the host filesystem 126 and/or host registry 128, possibly redirecting or overriding requests as determined by the configuration data block 121 of the virtualized application 110.

The virtual operating system 120 may be configured to support both merge and override virtualization semantics, down to individual file and folder granularity. This allows the contents of the virtual operating system 120 to be either entirely isolated from or merged with corresponding locations on the host computing device 12. The virtual operating system 120 dynamically remaps shell folder locations such as "My Documents" and "Application Data" folders to the appropriate location on the host computing device 12 so that proper application behavior is preserved across different versions of an operating system and different deployment structures. Similarly, the virtual operating system 120 dynamically remaps registry key values containing explicit path names or prefixes to the appropriate values for the executing host computing device 12.

The virtual operating system 120 may be configured to occupy approximately 400K of disk space uncompressed. Further, the virtual operating system 120 may have negligible runtime performance overhead. Further, the virtualized application executable 140 may compress all or at least a portion of the virtual environment data. In such embodiments, the virtualized application 110 may consume less disk space (e.g., about half) than the same application would consume if installed directly (or natively) on the host computing device 12.

The virtualized application executable 140 identifies one or more startup executables 160, which are incorporated in the virtualized application executable 140. Each of the startup executables 160 corresponds to a block of data stored in the virtualized application executable 140. The startup executables 160 may be identified in the configuration data block 121. For example, if the virtualized application 110 is an Avant Browser application, the startup executable 160 may be named "avant.exe." As will be explained in greater detail below, the virtualized application executable 140 may include more than one virtualized application 110. In such embodiments, the virtualized application executable 140 identifies multiple startup executables. For example, if the virtualized application executable 140 includes the application Microsoft Word, Excel, Powerpoint, and Access (all from the Microsoft Office Suite), the virtualized application executable 140 may include a separate startup executable for each application.

Hardware Virtualization

Unlike hardware virtualization systems such as Microsoft Virtual PC and VMware, the virtualized application executable 140 operates at the application level and virtualizes only those operating system features required to execute the virtualized application 110. This allows virtualized applications to operate efficiently, with essentially the same performance characteristics as natively installed executables. The virtualized application executable 140 executes at essentially the same speed that the virtualized application 110 would run natively on the host computing device 12, and requires only a small amount of additional memory. In contrast, when running within a typical prior art hardware-virtualized environment, the virtualized application 110 would experience significant slowdowns and require a greater amount of additional memory because the virtual machine includes and virtualizes an entire operating system.

Application Template 200

Aspects of the present application relate to customizable or configurable application templates that may be used to construct one or more virtualized application executable 140. The application templates are editable by a virtual application executable constructor (referred to herein as a "wizard tool") 170 installed on the host computing device 12. The wizard tool 170 includes a graphical user interface 172. Both the wizard tool 170 and the graphical user interface 172 are described in detail below. FIG. 4 illustrates an application template 200 that includes a configuration file 202 named "Configuration.xappl." The application template 200 also includes a filesystem configuration portion 204. In the example provided, the filesystem configuration portion 204 resides in a subdirectory named "\Files." However, this is not a requirement. Optionally, the application template 200 may include one or more plug-ins 206.

Example contents of an exemplary configuration file 202 are depicted in FIG. 5. By way of a non-limiting example, the configuration file 202 may be an XML file containing information for the virtualized application 110 related to the virtual filesystem 150, the virtual registry 152, the virtual process environment and threading subsystems component 154 (e.g., services, environment variables, and the like), and the startup executable(s) 160. The information may be stored in layers 208A and 208D, labeled "VirtualLayers." These layers include a default layer 208A ("<VirtualLayer Name="Default">") having default settings. In addition to the default settings of the default layer 208A, the configuration file 202 may include one or more conditional layers, such as the layer 208B ("<VirtualLayer Name="Win2K">") that specify settings specific to particular operating systems and/or versions thereof that may be executing on the host computing device 12.

The configuration file 202 also includes isolation information that indicates which portions of the virtual filesystem 150 and the virtual registry 152 are to be isolated from the host operating system 35 and which may access the host operating system 35. The isolation information for virtual directories in the virtual filesystem 150 and registry keys in the virtual registry 152 include one of the following identifiers: "Full," "WriteCopy," and "Merge."

If a folder is identified as "Full," only files in the virtual filesystem 150 are visible to the virtualized application 110, even if a corresponding directory exists on the host filesystem 126. Writes to a folder identified as "Full," are redirected to the sandbox data area. The "Full" identifier is generally used when complete isolation of virtual application 110 from the host operating system 35 is desired.

If a folder is identified as "Merge," files present in a virtual folder in the virtual filesystem 150 will be merged with files in a corresponding directory on the host filesystem 126, if such a directory exists. Writes to files in the host filesystem 126 are passed by the virtual operating system 120 to the host operating system 35 and writes to virtual files in the virtual filesystem 150 are redirected into the sandbox data area. The "Merge" identifier is generally used when some level of interaction between the virtual application 110 and the host operating system 35 is desired.

If a folder is identified as "WriteCopy," files present on the host filesystem 126 are visible to the virtual environment, but any modifications to folder contents are redirected to the sandbox data area. The "WriteCopy" identifier mode is generally used when the virtual application 110 needs to read from files present on the host filesystem 126 but isolation of the virtual application 110 from the host operating system 35 is still desired.

Returning to FIG. 4, the configuration file 202 references physical files present either in the filesystem configuration portion 204 of the application template 200 itself or in user-provided installation media (such as a CD, DVD, and the like). Files located in the application template 200 itself are placed in a hierarchy within the filesystem configuration portion 204. Each application file is placed in a location that corresponds to a location that an installed version of the file would occupy in the host filesystem 126 (see FIG. 3). These locations typically begin with well-known root folders. For example, for a Windows application, files stored in the standard Windows paths "c:\program files\" and "c:\documents and settings\user\application data\" are stored in locations that begin with @PROGRAMFILES@, and @APPDATA@, respectively.

FIG. 4 illustrates an exemplary reference 205 to a physical file named "App2.dll" that is present in the filesystem configuration portion 204. Specifically, the reference 205 indicates the file "App2.dll" may be found at ".\Files\Default\System\App2. DLL."

For illustrative purposes, in FIG. 4, the virtualized application 110 is named "Acme." Within the filesystem configuration portion 204 the startup executable 160 is named "App.exe" and is stored at "\Files\@PROGRAMFILES@\Acme\Application\," which corresponds to the path "c:\program files\Acme\Application\" of a natively installed version of the virtualized application 110 named "Acme."

Files residing on user-provided installation media are generally contained within package files stored on the installation media. When such package files are provided by Microsoft, they are typically stored in cabinet file format "CAB," which is a compressed archive format. Turning to FIG. 5, in the configuration file "202," these files are referenced with a CAB file identifier (e.g., CabID="1") and a CAB filename (e.g., CabName="App.EXE_1033").

Optionally, the application template 200 may also include one or more plug-ins 206 for use by the virtual application wizard tool 170 (described below). This plug-in 206 provides custom user interface dialogs and actions at build time. The configuration file 202 may also be viewed as a project file created using the wizard tool 170. If desired, the application template 200 may be compressed.

Method 300

Figure 6:
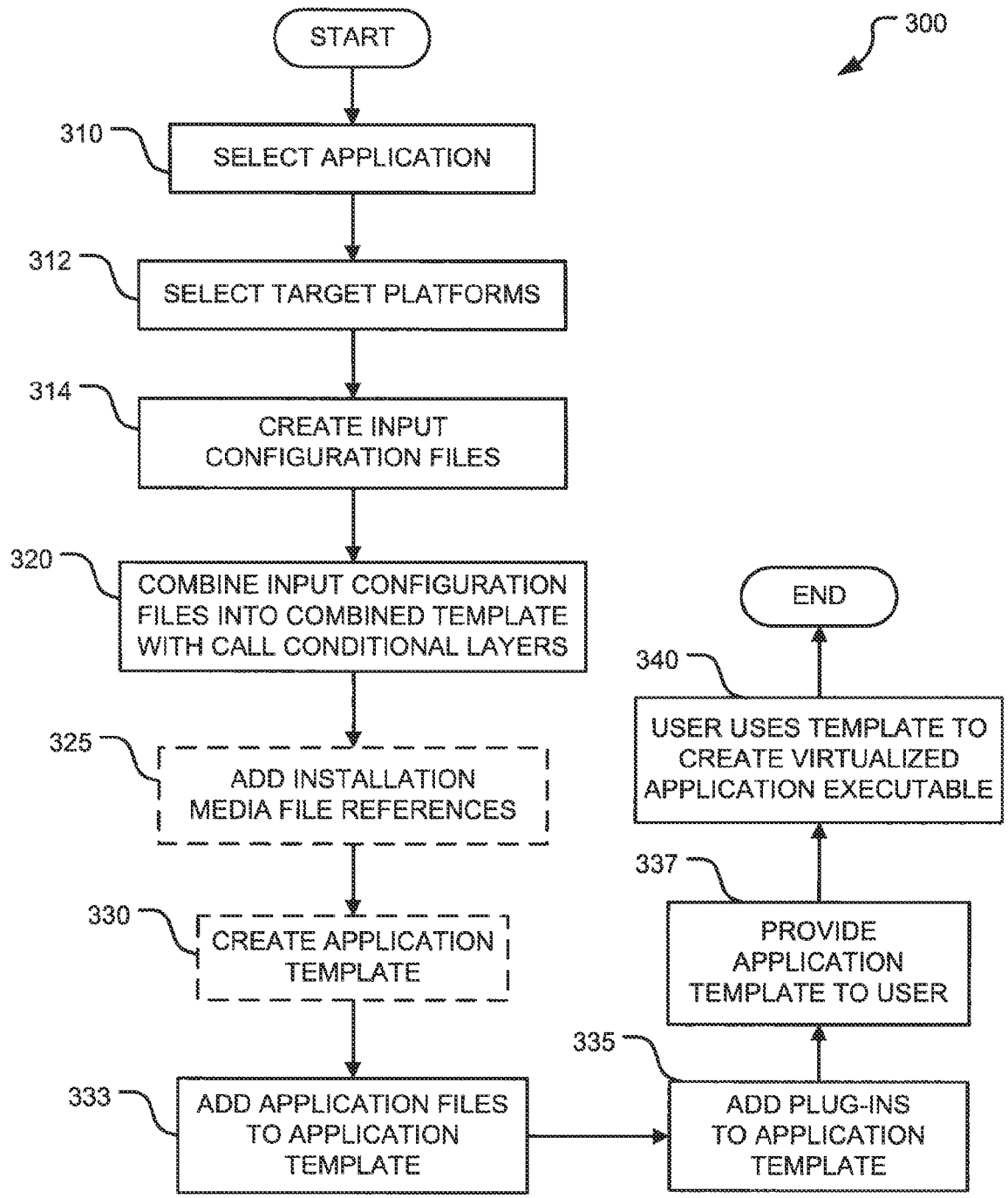
FIG. 6 is a flow diagram of a method performed by the system of FIG. 1 to create the application template and the virtualized application from the application template.

Referring to FIG. 6, aspects of the present invention relate to a method 300 of creating, modifying, and distributing customizable or configurable templates (such as the application template 200) that may be used to construct one or more virtualized application executable 140. The templates are editable by the virtual application wizard tool 170 described in detail below.

In first block 310, an application to be virtualized is selected. Then, in next block 312, at least one target platform (e.g., Windows XP, Shockwave implemented in Windows Vista, etc.) on which the virtualized application executable 140 is to be executed is selected. Generally, the target platforms include all major platform releases. In the case of Microsoft Windows, for example, the target platforms include Windows 2000, Windows XP, Windows 2003, Windows Vista, and Windows 2008.

Figure 7:
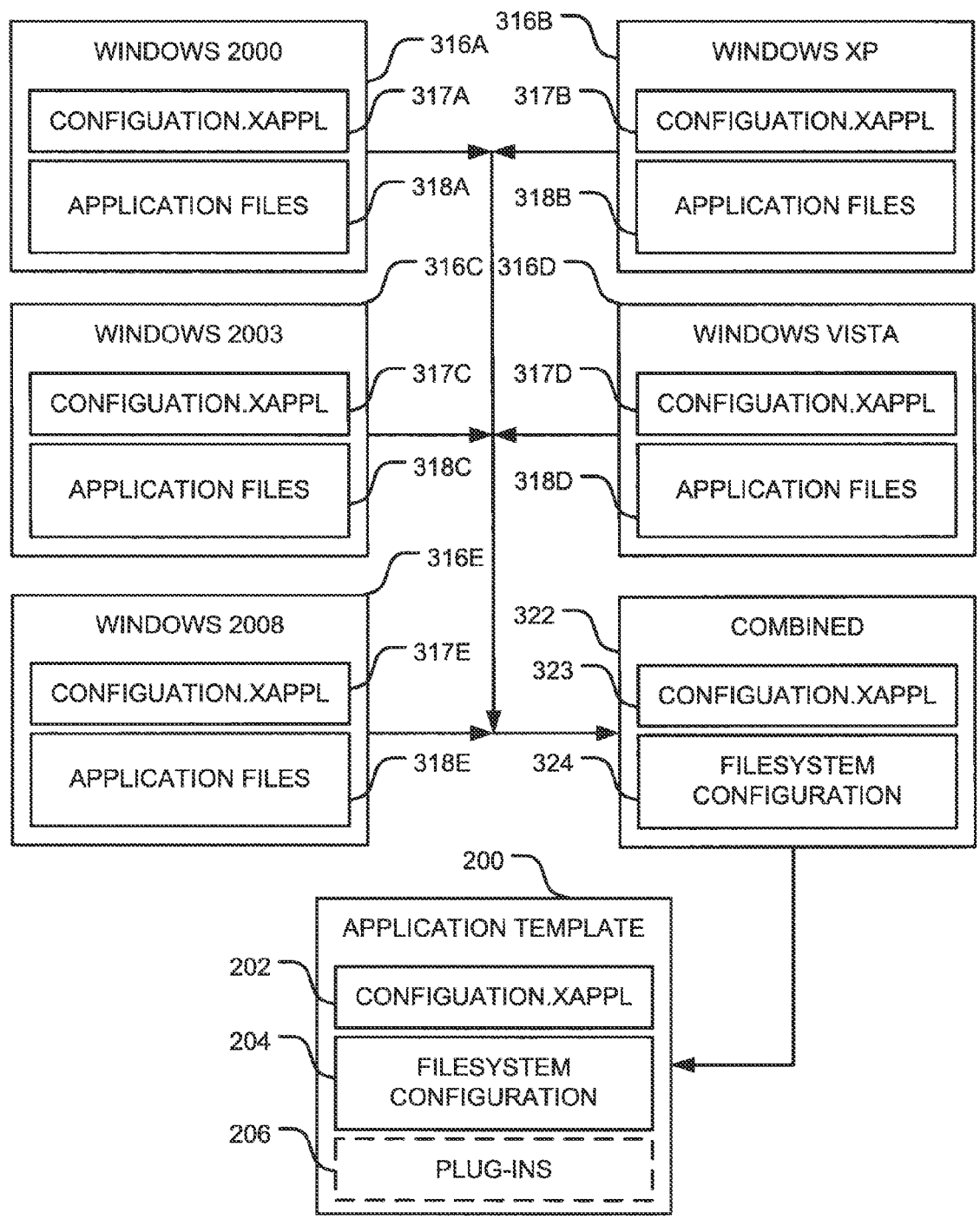
FIG. 7 is an illustration of a plurality of input configuration files, a combined template, and the application template.

In next block 314, at least one input configuration file is created for the application selected in the block 310. In block 314, an input configuration file is created for each target platform selected in block 312. Referring to FIG. 7, each input configuration file 316A-316E is substantially similar to the application template 200 described above but is configured for a single target platform. Thus, the input configuration files 316A-316E each include a configuration file 317A-317E, respectively, configured for a single target platform. Each of the configuration file 317A-317E may include only a default layer and omit conditional layers. Further, each of the configuration files 317A-317E includes explicit references to files stored in the input configuration file itself and may omit references to user provided installation media. Copies of the explicitly referenced files are included in a application file portion 318A-318E of each input configuration file 316A-316E, respectively. Optionally, each input configuration file 316A-316E may identify the target platform for which it was created. Alternatively, an operator may provide this information.

Any method known in the art for determining which operating system resources are used and configured by the application may be used to construct each of the input configuration files 316A-316E. By way of a non-limiting example, each input configuration file 316A-316E may be created using a snapshot technique for each target platform. The snapshot technique identifies changes made to the platform by the installation of the application selected in block 310. Using this technique, a "clean" computing device is configured for each of the target platforms (e.g., the computing devices 16A-16E illustrated in FIG. 1). A clean computing device is a computing device upon which only a known version of a particular operating system and no other application is installed.

Then, a first snapshot is recorded. The first snapshot captures a first system state before the application is installed natively on a "clean" computing device. The system state refers to existing entries in the host registry 128, files and directories present in the host filesystem 126, information stored in files (such as configuration files), values stored in environmental variables, links and shortcuts defined, services installed, COM components installed, and the like. Then, the application is installed natively on the "clean" computing device and a second snapshot is captured. The second snapshot captures a second system state that reflects changes to the system attributable to the installation of the application. Next, the first and second snapshots are compared to observe changes made to the system by the installation of the application. Finally, the input configuration file is configured for the application and target platform based on the changes observed.

Alternatively, the operating system resources used and configured by the application may be specified manually. Manual configuration requires a high degree of technical knowledge but allows extremely fine-grained control over virtualized application settings. This method may be used by developers virtualizing internally developed applications.

Turning to FIGS. 6 and 7, after the input configuration files 316A-316E are created, in block 320, they are combined into a single combined template 322 having a single configuration file 323 populated with conditional layers but lacking references to files stored on user-provided installation media. As mentioned above, the input configuration files 316A-316E may be transferred to the computing device 18 (see FIG. 1) and combined into the combined template 322 on that device.

The computing device 18 (see FIG. 1) may include a merge tool software component (stored in system memory 22 and executed by the processing unit 21) configured to implement block 320. Like the configuration files 317A-317E of each of the input configuration files 316A-316E, the single configuration file 323 of the combined template 322 includes explicit references files stored in the configuration file 323. These files are stored in a filesystem configuration portion 324 of the combined template 322.

To comply with licensing restrictions, it may be desirable to require a user of the virtualized application executable 140 have a legal copy of the virtualized application 110. Thus, optional block 325 may be performed for applications requiring user provided installation media. Further, by allowing the user to provide a portion of the files, the virtualized application executable 140 may require less storage space. Thus, even if licensing restrictions are not an issue, user provided installation media may be leveraged to minimize the size of the application template 200 itself. In optional block 325, for each application file stored on user provided installation media, a CAB reference to the file stored on the installation media is inserted into the configuration file 323. Referring to FIG. 5, each of the CAB references includes a parameter "CabID," a parameter "CabName," and a parameter "File Name."

Inserting the CAB reference includes assigning a unique identification number to the parameter "CabID" to the file. The parameter "CabID" may be assigned to each file using sequential numerical values. The value assigned to the parameter "CabName" is the filename used in the CAB package ("CAB filename"). The value of the parameter "File Name" is the filename given to the file after it is installed natively on a computing device ("installed filename"). In this manner, each CAB reference provides a mapping between the parameters "CabID," "CabName," and "File Name."

Because the configuration file 323 includes only the installed filenames, locating the files on the user provided installation media requires a mapping between the installed filenames and the CAB filenames. The mapping between the installed filenames and the CAB filenames may be determined by a Microsoft installer ("MSI") query of an installation database residing on the installation media. The query may be performed using the "MsiDatabaseOpenView" method. By way of a non-limiting example, the following structured query language ("SQL") query may be used: "SELECT 'FileName', 'File' FROM 'File'." As is apparent to those of ordinary skill in the art, this query queries a table named "File" and returns the values stored in two fields, "FileName," and "File." The table named "File" contains the mapping between the installed filename and the filename in the CAB package. The field "FileName" is the installed filename and the field "File" refers the filename within the CAB.

Once this mapping is known, one may locate the filename of a file stored in the CAB corresponding to an installed filename by looking up the installed filename in the results of the above query. Specifically, one may lookup each of the filenames listed in the configuration file 323 (which was created using a native installation and therefore includes only installed filenames) to determine the filename of the corresponding file in the CAB. The lookup may be performed using a hash algorithm such as MD5, and the like. If a match is found (i.e., the query results include the installed filename), the explicit reference to the file in the file configuration portion 324 is removed from the configuration file 323 and a CAB reference is inserted instead. At the completion of block 325, the configuration file 323 includes all appropriate Cab, CabId, and CabName cross references for files contained within CAB archives on the installation media.

By way of a non-limiting example, the following algorithm may be executed in block 325:

```
For each CabFile in InstallationMedia
    FileToCabFileMapping =
        CabFile.CreateMappingFrom("SELECT 'FileName',
            'File' FROM 'File'")
    For each ConfigFile in ApplicationConfiguration
        FileInCab = FileToCabFileMapping [ConfigFile.Name]
        If FileInCab == ConfigFile
            File.FileNameInCab = FileInCab.Name
            File.CabID = CabFile.ID
            Break
        End
    End
End
```

The conditional statement "If FileInCab==ConfigFile" in the above algorithm compares the file stored in the CAB to the file stored in the filesystem configuration portion 324 of the combined template 322 using a byte-by-byte comparison, MD5 hash, and the like.

As is apparent to those of ordinary skill in the art, the installation media may include more than one CAB file package. Further, each target platform may have different user-provided installation media, each including one or more CAB file packages. Thus, the above algorithm considers each CAB file package ("CabFile") separately.

The computing device 18 (see FIG. 1) may include a CAB linker tool software component (stored in system memory 22 and executed by the processing unit 21) configured to implement block 325.

Next, in optional block 330, the combined template 322 is used to create the application template 200 that may optionally be compressed to create a compressed application template. For example, the application template 200 may be archived in a compressed target package using any suitable compression format, such as a zip file format. After the application template 200 is created, the configuration file 323 from the combined template 322 is added to the application template 200.

Next, in block 333, all files not associated with a CAB reference to user provided installation media are added to the application template 200 (which may optionally have been compressed in block 330). This may be accomplished by iterating over each file listed in the configuration file 323 of the combined template 322 (or the configuration file 202 of the application template 200), if no CAB reference is present for the file, the file is copied to the filesystem configuration portion 204 in the application template 200 in the same relative directory in which it was stored in the combined template 322.

Iterating over the configuration file 202 may include iterating over the explicit references to files provided in the configuration file. In block 325, explicit references to files were removed when a CAB reference to the file is added. Therefore, if the iteration is conducted over the explicit file references one would not need to determine whether a CAB reference is present for a file. Alternatively, the iteration may be conducted over the filesystem configuration portion 324 of the combined template 322. If a CAB reference is present for the file, it is not copied to the application template 200. Otherwise, the file is copied to the filesystem configuration portion 204 of the application template 200 in a location corresponding to its location in the filesystem configuration portion 324 of the combined template 322. Optionally, after the application files have been copied to the filesystem configuration portion 204 of the application template 200, the application template 200 is compressed.

For some applications, additional customization plug-ins may be developed to show custom user interface options and perform custom actions and/or operate on the application template files. Such customization plug-ins or tools may be provided to the user in block 337 by adding the plug-ins 206 to the application template 200. By way of a non-limiting example, a customization plug-in may include an application for editing a configuration file such an "application.ini" file. A customization plug-in for a virtualized web-browsing application may be used to set a default page of the virtualized web-browsing application.

In block 337, the application template 200 is provided to the user. By way of a non-limiting example, the application template 200 may be published to a website hosted on the server 14. The user may receive a copy of the application template 200 by downloading it from the server 14 over the network 13. Plug-ins may also be downloaded from the website, emailed to the user, stored on media and provided to the user, and the like. In some implementations, the plug-ins are integrated directly into the wizard tool 170.

The website may include an application template manifest or list of application templates available for download. Further, the virtual application wizard tool 170 may include such a manifest or list, which may be updated to reflect the availability of the application template 200. For example, the manifest or list may be populated dynamically from the server 14.

In block 340, the user uses the application template 200 to create the virtualized application executable 140. As mentioned above, the virtualized application executable 140 is built from the application template 200 using the virtual application wizard tool 170. In the drawings, the wizard tool 170 is depicted as installed on the host computing device 12. However, this is not a requirement. The wizard tool 170 may be installed on any suitable computing device (such as computer 20 illustrated in FIG. 2) and used to create the virtualized application executable 140. After it is created, the virtualized application executable 140 may be transferred to any computing device, including the host computing device 12, using any method known in the art.

As mentioned above, the virtualized application executable 140 includes the virtual application configuration data block 121. This file is built by the wizard tool 170 and may include any information present in the configuration file 202, including isolation information, any virtual layers present in the configuration file 202, and the like. The virtual application configuration data block 121 may also include basic application metadata and settings such as the application name, application version, and sandbox location. The sandbox is a location on the host filesystem 126, a network share, a removable storage device, and the like whereat files may be written, modified, and deleted by the virtualized application 110. As is apparent to those of ordinary skill in the art, the blocks of data (corresponding to application files) in the virtualized application executable 140 are read-only. Thus, if modifications to these blocks of data that correspond to application files are required, these modifications are made to files stored in the sandbox. The wizard tool 170 may allow the user to specify some application settings, such as the sandbox location. The wizard tool 170 also incorporates a copy of the virtual operating system 120 in the virtualized application executable 140.

Method 400

Figure 8:
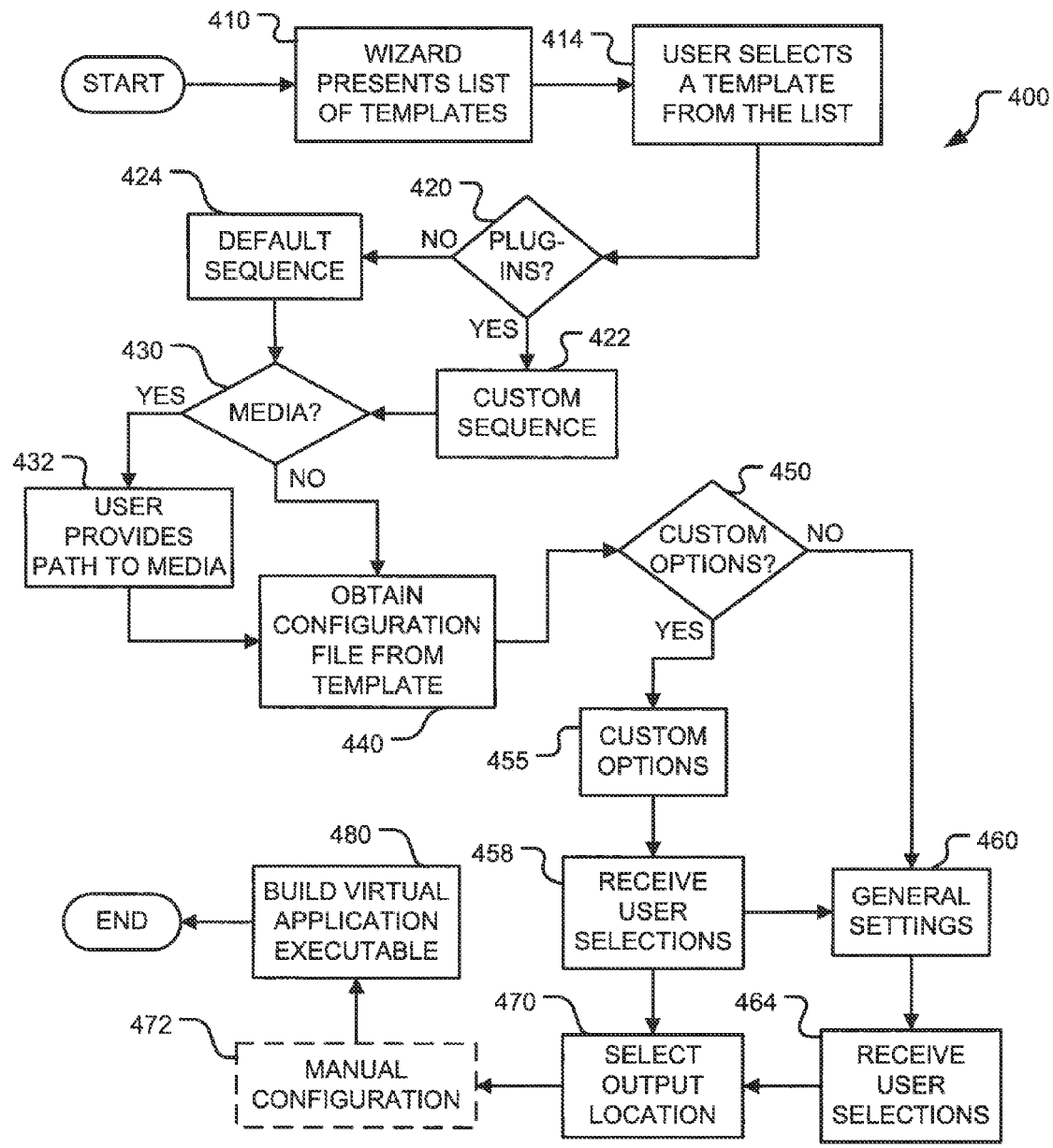
FIG. 8 is a method of using the application template to create the virtualized application executable.

FIG. 8 is a flow diagram of a method 400 of using the application template 200 to create the virtualized application executable 140. The method 400 may be performed in block 337 and block 340 of the method 300, described above. The wizard tool 170 includes a graphical user interface component 172 (see FIG. 4) containing a predetermined sequence of actions that the user must perform. The wizard tool 170 may be a stand-alone application or integrated into a general-purpose virtualization software application.

In first block 410, the wizard tool 170 uses its graphical user interface component 172 to display at least a portion of the application template manifest to the user. In block 414, the user selects the application template 200 from the manifest.

Then, the user uses the graphical user interface component 172 to select at least one application template. After an application template is selected, it may be downloaded from the server 14 and optionally cached for possible re-use. Alternatively, the application template may have been downloaded before it was selected by the user.

The selected application template may include one or more plug-ins 206. The wizard may use or implement these plug-ins 206 to offer user interface steps and actions for that the selected application template. For example, a plug-in might include a license key field dialog along with custom code to validate the license. Additionally, to simulate windows installer actions and to obtain dynamic installation configuration, such as an application license file, the wizard tool 170 may virtualize MSI APIs, such as MsiOpenDatabase, MsiGetProperty, and MsiSetProperty, among others.

Once an application template 200 is selected, in decision block 420, the wizard tool 170 determines whether any custom plug-ins are to be used. If the decision in decision block 420 is "YES," the custom user interface dialog sequence and subsequent actions are executed instead of the default sequence. In block 422, the custom sequence may include any of the functions described below with respect to the default sequence. Then, as illustrated in FIG. 8, the method 400 advances to decision block 430.

Otherwise, if the decision in decision block 420 is "NO," the method 400 advances to block 424 and the default sequence of user interface dialog sequence and subsequent actions are executed, and then advances to decision block 430.

In decision block 430, the wizard tool 170 queries whether the template requires installation media, such as an installation CD. This may be achieved by determining whether the configuration file 202 includes one or more CAB references. If the decision in decision block 430 is "YES," in block 432, the user inputs a path to the installation media in the graphical user interface component 172. Before the path is input by the user, the wizard tool 170 may prompt the user for the path to the installation media. Then, the method 400 advances to block 440.

If the decision in decision block 430 is "NO," the method 400 advances to block 440.

In block 440, the wizard tool 170 obtains the configuration file 202 along with the required application files. Application files identified in the configuration file 202 by CAB references are extracted from the installation media. If the application template 200 is compressed, the method 400 may need to extract or decompress the configuration file 202. The algorithm performed in block 440 may be a simple enumeration of all files in the configuration file 202 along with CAB extraction from the user provided installation media of any files referenced by CAB references. In other words, the wizard tool 170 reads the configuration file 202, identifies any CAB references present, obtains files identified by CAB references from the user provided installation media, identifies any explicit references present, and extracts any files identified by explicit references from the filesystem configuration portion 204 of the application template 200.

Then, in decision block 450, if the application template 200 included one or more custom plug-ins 206 (i.e., the decision in decision block 420 was "YES"), the wizard tool 170 determines whether the plug-ins 206 include any application specific customizations. If the decision in decision block 450 is "YES," in block 455, the wizard tool 170 offers those application specific customizations to the user. For example, as mentioned above, a plug-in may configure a home page or URL of a virtual web-browsing application. The user may opt to customize the virtualized application 110 or continue with the default settings. Application specific customizations may be implemented with the plug-in 206, which knows how to operate on the extracted files specific to the virtualized application 110. After receiving the user's selections in block 458, the method 400 advances to block 460.

If the decision in decision block 450 is "NO," the method 400 advances to block 460.

At block 460, general virtual application settings are offered to the user. For example, the location for the virtual application sandbox may be customized. In block 464, the user provides the user's selections for the application settings. The user may opt to customize the virtual application settings or continue with the default settings.

In next block 470, the user is prompted to select the output location for the virtual application executable 140. At this time, all required virtual application settings and files are available to build. In next block 472, the user may opt to do further manual configuration beyond what is provided in the application template 200. Lastly, in block 480, the virtual application executable 140 is built and the method 400 terminates.

Method 500

Figure 9:
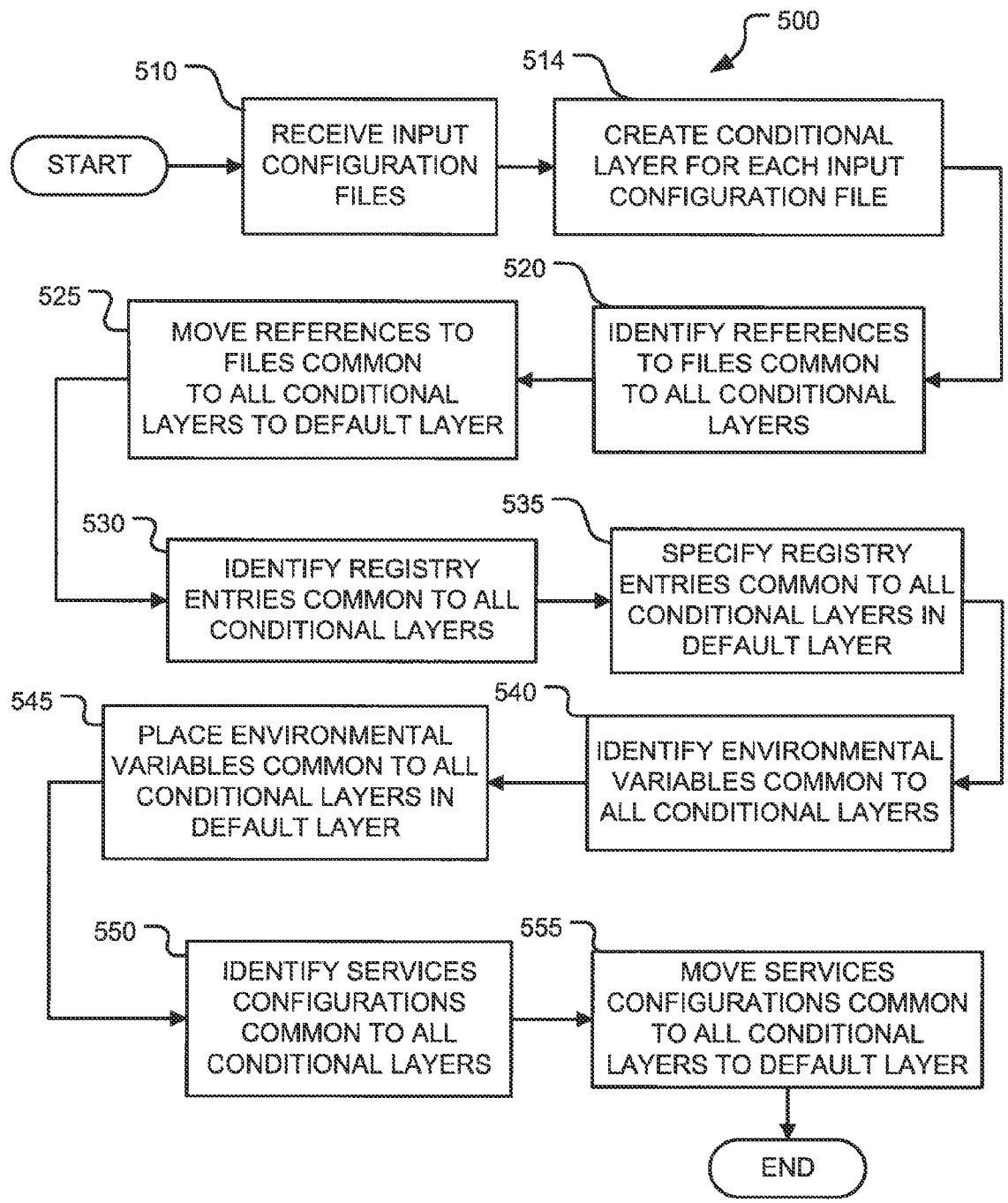
FIG. 9 is a method of creating conditional layers in the combined template.

FIG. 9 is a flow diagram of a method 500 of combining the input configuration files 316A-316E (see FIG. 7) into the single combined template 322 with conditional layers. The method 500 may be performed in the block 320 of the method 300, described above. Often, application installers install certain files, registry entries, environment variables, and services depending on which operating system or version is running on the host computing device 12. For example, the Microsoft SQL Express installer does not install the SQL VSS Writer service on computing devices running Windows 2000 because the Windows 2000 operating system does not support the SQL VSS Writer service. To allow virtualized applications to run correctly on all versions of Windows, these conditional portions of an application's install footprint must be incorporated into the configuration of the virtualized application executable 140. At runtime, the conditional portion of the virtualized configuration corresponding to the operating environment implemented on the host computing device 12 is leveraged by the virtualized application executable 140.

In first block 510, the method 500 receives the input configuration files 316A-316E created in block 314 of the method 300 for each target platform. In block 514, a conditional layer is created in the combined template 322 for each input configuration file 316A-316E and populated with the contents of the default layers in the configuration files 317A-317E, respectively. As mentioned above, each of the configuration files 317A-317E, which were created for a single target platform, include only the default layer and no conditional layers.

Then, in block 520, the explicit file references in the conditional layers are analyzed using any method known in the art to identify any files common to all conditional layers. In next block 525, any files common to all layers are added to the default layer of the configuration file 323 and removed from the conditional layers.

Then, in block 530, the registry entries in the conditional layers are analyzed using any method known in the art to identify any registry entries common to all conditional layers. In next block 535, any registry entries common to all layers are added to or specified in the default layer of the configuration file 323 and removed from the conditional layers.

Then, in block 540, the environment variables in the conditional layers are analyzed using any method known in the art to identify any environment variables common to all conditional layers. In next block 545, any environment variables common to all layers are added to or specified in the default layer of the configuration file 323 and removed from the conditional layers.

Then, in block 550, services configurations in the conditional layers are analyzed using any method known in the art to identify any services configurations common to all conditional layers. In next block 555, any services configurations common to all layers are added to or specified in the default layer of the configuration file 323 and removed from the conditional layers. Then, the method 500 terminates.

At the completion of the method 500, all files, registry entries, environment variables, and services that are common to all configuration files 317A-317E are placed in the default layer of the combined configuration file 323. Any aspects of the configurations that remain reside in the appropriate conditional layer.

By way of a non-limiting example, blocks 514, 520, and 525 may perform the following merge algorithm:

```
// First extract all of the default-layers from all input configurations.
// Only the default layers are populated at this time
Layers = List.Empty
For each Config in Configurations
    Layers.AddLayer(Config.Defaultlayer)
End
//
// Next, merge files
//
DefaultLayer = Layer.Empty
CommonFiles = List.Empty
FirstLayer = Layers [0]
For each File in FirstLayer
    For each Layer in Layers where index ≠ 0
        FileAlt = Layer.Lookup(File.Path)
        If Not Found(FileAlt) Or Not FileAlt.MatchesMD5(File)
            Break
        End
    End
    If [found in all layers]
        CommonFiles.Add(File)
    End
End
//
// Move all common files to default layer
For each File in CommonFiles
    DefaultLayer.AddFile(File)
    // Any 'Common' files must get removed from original layers
    For each Layer in Layers
        Layer.DeleteFile(File)
    End
End
//
// Merge registry, environment variables, and services config via
// same algorithm used for files
//
// Lastly, add the conditions for the non-default layers for the
// particular OSes from which the layers came.
```

As is apparent to those of ordinary skill in the art, additional conditional layers may be added to specify files, registry entries, environmental variables, services configurations, and the like common to fewer than all of the configuration files 317A-317E. For example, a reference to a particular file may be common to all target platforms except Window Vista. A conditional layer could be added to the configuration file 323 and applied when the virtualized application executable 140 is executed on an operating system other than Window Vista.

At the completion of the method 500, the single configuration file 323 including populated conditional layers has been created. As mentioned above, each input configuration files 316A-316E identifies the target platform for which it was created. When the conditional layers are created in block 514, the target platform associated with the layer is identified and specified in the layer.

Conditional layers include conditional elements (or operators). By way of a non-limiting example, the conditional elements may include the following relational operators: equal; not-equal; greater than; less than; greater or equal; and less or equal. For conditional layers created for Microsoft Windows operating systems, the conditional elements may be used with respect to the following values: Pre-Windows 2000; Windows 2000; Windows XP; Windows 2003; Windows Vista; Windows 2008; post-Windows 2008. For example, a conditional layer might have the following conditional element: "<Condition Variable="OS" Operator="Less than" Value="Windows Vista"/>." In this example, the conditional layer will be used if the host operating system 35 on the host computing device 12 is older than Microsoft Vista. Thus, the condition would be true if the host operating system 35 is Windows XP and the conditional layer would apply.

Once the configuration file 323 with the conditional layers is constructed, the virtualized application executable 140 is built containing the conditional layers. This configuration is incorporated into the configuration data block 121 of the virtual application executable 140 and is available to the virtualization runtime at initialization time.

Incorporating Multiple Applications in a Single Executable

Many applications and application suites include multiple startup files or executables. For example, the Microsoft Office suite, depending on the SKU, includes at least four different application executables, one each for Word, Powerpoint, Outlook, and Excel. However, the method 300 creates a single virtualized application executable 140. Therefore, to virtualize applications and application suites (such as the Microsoft Office suite), the virtualized application executable 140 must incorporate multiple startup executable 160. Further, the user must be able to specify which of the applications the user would like to execute.

As is appreciated by those of ordinary skill in the art, applications may be called or executed using a command line. Instances of applications may also be launched from other applications. In Microsoft Windows operating systems, a user may execute an application by typing the path and filename of the executable file in an instance of the Command Prompt. Alternatively, "shortcuts" may be configured that include a command line associating a target executable with optional command line arguments.

Many command line commands allow a user to specify values of predetermined parameters. To support multiple applications, the virtualized application executable 140 may be configured to support one or more predetermined parameters.

For example, the virtualized application executable 140 may support a command line trigger parameter that indicates which startup file is launched. In this example, if the virtualized application executable 140 is named "VirtualizedOffice.exe" and implements a virtualized version of the Microsoft Office suite, Microsoft Word may be executed but none of the other applications in the suite by entering a parameter value identifying Microsoft Word. To use the command line trigger parameter at runtime, the trigger may be entered as the first argument in the command line. For example, the following command may be entered: ">VirtualizedOffice.exe WORD" at the command prompt. In response to this command, the virtualized application executable 140 is executed by the host operating system 35. When executed, the virtualized application executable 140 is configured to use the first argument, which is the parameter value "WORD," to launch only Microsoft Word.

In addition to identifying an executable to launch, one or more predetermined parameters and values may be associated with the trigger. Many application executables accept command line parameters to enable special behaviors, turn on/off features, and the like. For example, the Microsoft Word executable accepts several parameters, such as "/safe," which starts Microsoft Word in safe mode, "/q," which starts Microsoft Word without displaying the splash screen, etc. To turn off the Microsoft Word splash screen in a virtualized version of the Microsoft Office Suite, one would pass the parameter "/q" to the virtualized version of the Microsoft Word before the application is launched as described above.

In this implementation, the configuration data block 121 of the virtualized application executable 140 incorporates startup information that specifies a file path for each startup executable 160, one or more virtual command line arguments associated with each executable, a trigger token for each executable, and an auto-start flag for each executable. The startup information may be stored in a tabular format having the following columns: file path, virtual command line arguments, trigger token, and auto-start flag. For illustrative purposes, Table 1 below provides an example in which the startup information is organized in a tabular format.

TABLE 1

| File Path | Command Line | Trigger | Auto-Start |
|---|---|---|---|
| @PROGRAMFILES@\Acme\App.exe | | MAIN | True |
| @PROGRAMFILES@\Acme\Utility.exe | /advanced | UTIL | False |
| ... | | | |

In Table 1, the "Command Line" field specifies the argument passed to the virtualized application 110 for each trigger token specified in the "Trigger" field. If the auto-start flag is set to "TRUE," the corresponding file identified by the "File Path" is started even if no trigger was specified in the command line. The above startup file format allows for flexible configuration. For example, one could use the same trigger to launch multiple applications in a "Shotgun-like" manner.

Figure 10:
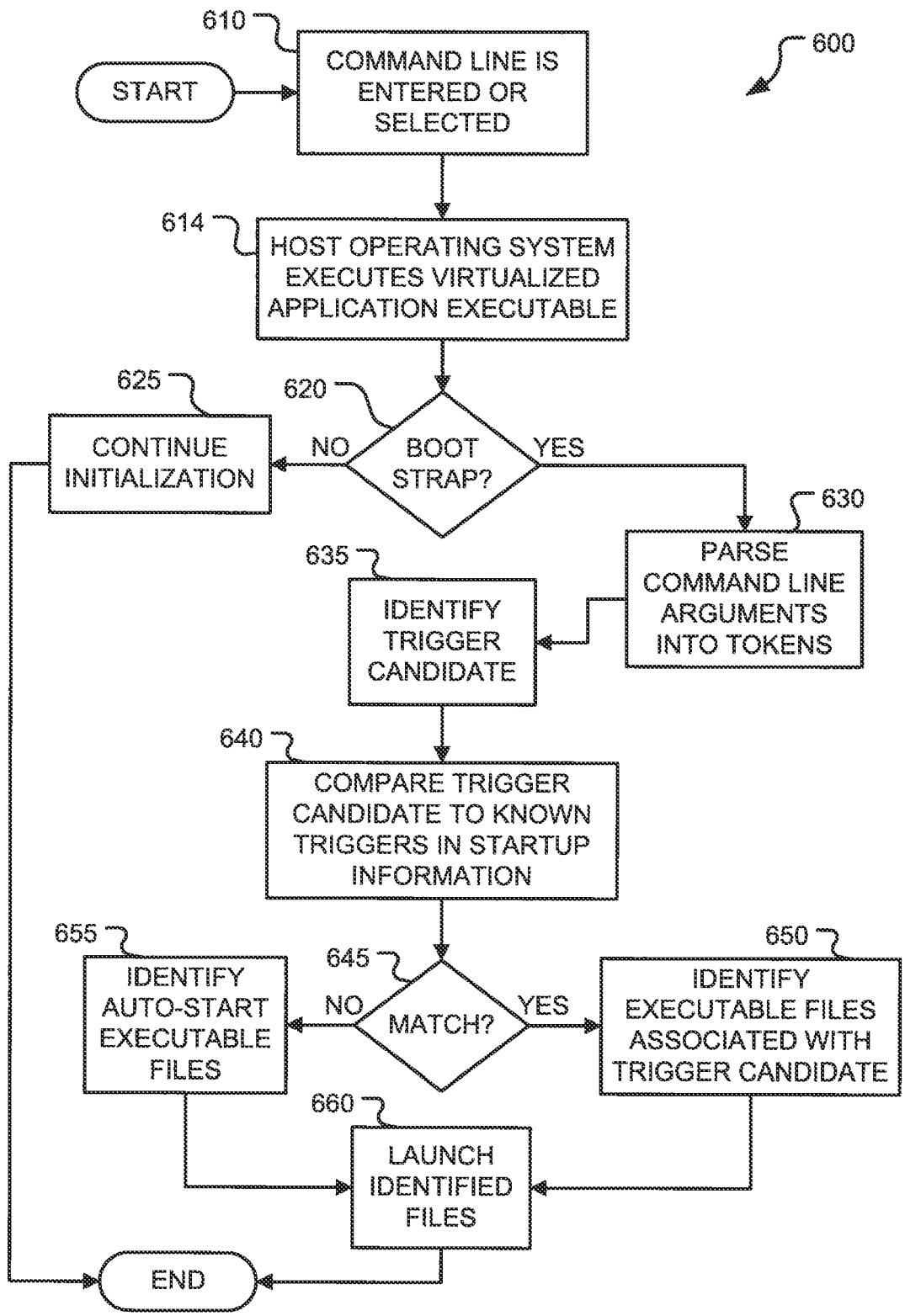
FIG. 10 is a method of executing one or more applications incorporated in a single virtualized application executable.

FIG. 10 depicts a method 600 that may be used to determine which startup executable(s) 160 to launch at runtime. In first block 610, a command line is entered or selected. The command line may have been entered by the user at the command prompt. Alternatively, the command line may have been selected by the user using a "shortcut." The "shortcut" may have been created by third-party "Systems Management" software such as from LANDesk, KACE, and others, the may have pushed down the virtualized application executable 140 along with one or more pre-configured shortcuts having preconfigured "Trigger" parameters. Alternatively, a simple installer tool may have been used to automatically configure one or more shortcuts. Then, in block 614, the host operating system 35 executes the virtualized application executable 140, and passes the command line to the virtual operating system 120 causing the virtual operating system to begin initialization.

In decision block 620, whether the executing virtualized application executable 140 is a "bootstrap" process is determined. A "bootstrap" process is a first process instance of the virtualized application executable 140. A bootstrap process is launched outside the executing virtualized application executable 140. When a bootstrap process is launched, the virtual operating system 120 must be initialized and configured. During this initialization, the virtual operating system 120 processes any trigger tokens included in the command line. After the initialization and configuration of the virtual operating system 120 is complete, the bootstrap process is executed by the virtual operating system 120.

Under certain circumstances, one or more child processes may be launched by a process executing inside the virtualized application executable 140. For example, if a virtualized instance of Microsoft Word has been launched and is executing inside the virtual operating system 120, a user may launch a virtualized instance of Microsoft Excel from inside the virtualized instance of Microsoft Word by clicking on an embedded spreadsheet. In this example, the virtualized instance of Microsoft Excel is a child process of the virtualized instance of Microsoft Word, which is the bootstrap process. When a child process is launched, the virtual operating system 120 has already been initialized, configured, and running. Therefore, these operations may be bypassed.

Whether block 614 has executed the first process instance of the virtualized application executable 140 may be determined by the non-presence of shared-memory data-structures for coordinating multiple virtual application processes. A method of making this determination is provided below.

If decision block 620 determines the process is not the bootstrap process (i.e., the decision in block 620 is "NO"), in block 625, the command line arguments can be used as-is and the virtualization runtime initialization simply continues. In other words, a child process has been launched from inside the executing virtualized application executable 140. Therefore, any arguments included in the command line are not trigger tokens and may be passed directly to the child process for processing. Then, the method 600 terminates.

Otherwise, if decision block 620 determines the process is a bootstrap process (i.e., the decision in block 620 is "YES"), in block 630, the virtualized application executable 140 parses the command line arguments entered by the user in block 610. The command line parsing task may be complicated by the fact that the built-in Windows function "CommandLineToArgv" may be unavailable due to isolation. Therefore, command line parsing may be implemented by splitting the full command line string into tokens. Each token is defined as either a non-white space delimited character string or a quoted string. The following regular expression may be used to perform the parse:

{(\"[^\"]*\")|[^\t]+}

Once the command line tokens have been obtained, in next block 635, a candidate trigger is identified. Whether the first argument (or token) refers to the virtualized application executable 140 itself is determined in block 635. Depending upon the implementation, the virtualized application executable 140 may be specified in four formats (corresponding to the four ways one is able to specify an executable from the windows shell and command prompt). If the virtualized application executable 140 is named "virtualapp.exe," at the command prompt, the executable 140 may be executed using one of the following formats:

1. c:\directory\virtualapp.exe;
2. c:\directory\virtualapp;
3. virtualapp.exe; and
4. virtualapp If the first argument has one of the above formats and a second argument is present, the second argument is the trigger candidate. If the first argument does not have any of the above formats, the first argument is the trigger candidate. If the first argument matches the virtualized application executable 140, the first argument may be stored for later when the virtual command line is re-constituted.

If the trigger candidate is present, in block 640, the trigger candidate is compared to the known triggers listed in the startup information. If a match is found (i.e., the decision in decision block 645 is "YES"), in block 650, all of the startup executables 160 associated with the trigger are identified. Otherwise, if no match is found (i.e., the decision in decision block 645 is "NO"), in block 655, the "Auto-start" startup executables 160 are identified. In alternate embodiments, in block 650, after all of the startup executables 160 associated with the trigger are identified, block 655 may be used to identify the "Auto-start" startup executables 160.

After the executable files are identified, in block 660, each is launched in a separate virtualized process. Also at this time, any additional command line arguments specified by the configuration of each executable file (see e.g., Table 1) must be concatenated with any remaining command line arguments that may have been passed to the bootstrap process. Then, the method 600 terminates Virtualizing Side-by-Side Beginning with Windows XP, a new deployment technology was introduced named "Side-by-Side," or "SxS." SxS allows different versions of the same software component to be deployed on a single windows system. It also allows an application to specify an exact version of a software component thereby isolating the application from other software installed on the machine. SxS was developed as a solution to the problems created by multiple versions of dynamic link libraries "dll" used by different applications.

The unit of deployment in SxS is called an "assembly." An assembly is one or more files, usually including at least one dll, that together implement a single software component. For example, starting with version 8.0 the Microsoft C-runtime is now deployed as an SxS assembly and includes the following three files: msvcr80.dll, msvcp80.dll, and msvcm80.dll.

An application can be developed to use SxS deployed assemblies by use of a manifest specifying the assembly by name and version. The name can also be a strong name, which means a public key token is part of the name.

There are a few problems virtualizing SxS. First, considerable time is required to reverse engineer the SxS APIs to determine their signatures and behavior. Second, the SxS APIs are high-level APIs that interact with many other high-level Windows APIs, such as LoadLibrary APIs, COM APIs, and CreateWindow APIs. Because virtualization method provided operates at a low-level, namely at the interface before entering Kernel-mode, complete virtualization of SxS cannot be reliably done without also virtualizing the other related high-level APIs. Doing so would introduce quite a bit of additional work. Third, SxS APIs involve a system process, namely Microsoft Client/Server Runtime Server Subsystem ("csrss.exe"), that cannot be virtualized. If instead of completely virtualizing SxS, one were to leverage the native SxS infrastructure, any assembly and manifest references used must be physically located on the host filesystem 126 of the host operating system 35. Otherwise, the Microsoft Client/Server Runtime Server Subsystem process cannot find the files. In Microsoft Windows operating systems, a special folder contains all installed SxS assemblies. Typically, administrator privileges are required to install an SxS assembly in this special folder. Generally, this file is located at "c:\windows\winsxs\."

Because of the above constraints, the virtualized application executable 140 implements a hybrid approach for virtual SxS implementation. This approach uses the native SxS infrastructure to avoid fully virtualizing SxS and the related high-level Windows APIs. The hybrid approach also provides a private SxS assembly cache and physically faults-in assembly and manifest files into the cache, making it visible to the Microsoft Client/Server Runtime Server Subsystem process. Application manifests are rewritten to remove the public key token from the assembly names and incorporate the version in the assembly names. Unlike public assemblies, private assemblies cannot include multiple versions of the same assembly. Lastly, the CreateActCtx APIs are virtualized to support redirection to the private assembly cache and the QueryActCtx APIs are virtualized to support remapping paths back to their virtual location during introspection calls.

An assembly always includes an assembly manifest which describes the assembly. FIG. 11 provides an example of an assembly manifest 680. Note the name of the assembly is "Microsoft.VC80.CRT." Applications that want to use an assembly must refer to that assembly via an application manifest created by the application developer. FIG. 12 provides an example of an application manifest 690 that uses the assembly "Microsoft.VC80.CRT." The application manifest 690 lists a dependency on the assembly manifest 680. Both the assembly and the assembly manifest 680 include a publicKeyToken reference (e.g., "publicKeyToken="1fc8b3b9a1e18e3b"") because if installed, the assembly is public and is available to all processes on the host computing device 12.

To virtualize the assembly having the assembly manifest 680, one must "privatize" the assembly by first removing the publicKeyToken and incorporating the version into the name of the assembly. The later step is performed to allow for privatizing multiple versions of the same assembly, which is not otherwise permitted by the SxS infrastructure. FIG. 13 depicts the assembly manifest 680 after privatization and FIG. 14 depicts the application manifest 690 after privatization. Note in FIGS. 13 and 14, the name of the assembly has been changed in both manifests 680 and 690 from "Microsoft.VC80.CRT" to "Microsoft.VC80.CRT@8.0.50727.42" to incorporate the version ("8.0.50727.42") in its name. Further, in FIGS. 13 and 14, the publicKeyToken has been removed from both privatized manifests 680 and 690.

In this implementation, privatization is performed during the build phase (e.g., during block 480 of the method 400) of a virtualized application executable 140. However, in alternative implementations, privatization may be performed dynamically at runtime.

Assemblies are identified by application manifests, which may be located in application dlls and executables. Application manifests having the ".manifest" extension may also be included in the application files and identified as assembly manifests by their file extension. Assemblies used by the application may also be identified by their inclusion in the special folder "c:\windows\winsxs."

Once privatization is complete, the privatized manifests 680 and 690 are saved and made available for requests for the virtualized assembly. The privatized manifests 680 and 690 may be stored in a private SxS cache (not shown) configured for the virtualized application 110; however, this is not a requirement.

Applications request use of an assembly by calling an API named "CreateActCtx" and providing as input a data structure named "ACTCTX." The data structure "ACTCTX" includes an identification of a path. The path may be to an application manifest file (having the name "*.manifest") or alternatively to another file (e.g., a dll, an executable file, and the like) containing the application manifest. The data structure "ACTCTX" also includes a resource identifier in the lpSource and lpResourceName members of the structure. The member "lpSource" refers the file path of the file containing the application manifest and the member "lpResourceName" is the resource identifier. The call to the "CreateActCtx" API is intercepted by the virtualization runtime.

When the call is intercepted, whether the application manifest file (i.e., the manifest file, dll, executable, and the like) located by the path in the data structure "ACTCTX" has been virtualized is determined. If the file has been virtualized, the call is re-built or modified to replace the path to the public application manifest with a path to the privatized application manifest. The replacement path must be a physical path. Further, the privatized application manifest and dependent assemblies must be faulted-in to or otherwise stored in the private SxS cache configured for the particular virtual application. For the re-built call to CreateActCtx to succeed, a flag ACTCTX_FLAG_ASSEMBLY_DIRECTORY_VALID of the dwFlags member of the data structure "ACTCTX" must be set to "TRUE" and the path to the private SxS cache must be provided in a lpAssemblyDirectory member of the data structure "ACTCTX".

The private SxS cache may be located within the filesystem configuration portion 204 at any location. For example, the private SxS cache may be located within the filesystem configuration portion 204 at the following location: %APPDATALOCAL%\Xenocode\XSandbox\AppName\AppVersion\Virtual\SxS\ . . . .

To conform to rules governing private assemblies, within the location storing the private SxS cache, a subfolder may be created (e.g., folder "Manifests") in which the application manifest and the assembly manifest may be stored. Further, a subfolder may be created for each privatized assembly, in which the privatized assembly may be stored. The subfolders created for each privatized assembly may be named based on the name of the assembly.

Sometimes after requesting use of an assembly, applications will request path information about the location of assembly and/or referencing application files. An application does so via the QueryActCtx API. In order for certain applications to behave correctly, the paths returned from this API may be mapped from the private SxS cache to the original public locations. Therefore, a mapping between any privatized components (e.g., assemblies and applications) and original public components (e.g., assemblies and applications) must be maintained.

For example, for a .NET application, it may be useful to maintain a mapping to the path of the virtualized application executable 140. The .NET runtime initialization routine determines whether the virtualized application 110 has an active activation context (as created by a call to the Create- ActCtx API). If it does, the routine calls QueryActCtx to determine the location of the executing assembly. The location returned is used to locate other application assemblies. If the wrong location (or un-virtualized location) is returned, the virtualized application 110 will not find any of its other application assemblies and will fail to execute correctly. Therefore, the call to the CreateActCtx API may be intercepted by the virtualization runtime and the mapping between the privatized assemblies and the original public assemblies used to provide the virtualized locations (i.e., location of the privatized SxS cache) of the privatized assemblies.

Method 700

For illustrative purposes, a method 700 will be described with respect to the input configuration file 316A. However, as is apparent to those of ordinary skill in the art, the method 700 may be repeated for each of the input configuration files 316B-316E. When the input configuration file 316A is first obtained in block 314 of the method 300, using any of the many setup capturing techniques (e.g., snapshotting), the input configuration file 316A must be processed on the same computing device 16D on which the template was captured to make sure the input configuration file 316A is independent of the hardware and software installed in the computing device 16D. This processing may occur as the input configuration file 316A is constructed or after its initial construction as a separate process. The main function of this processing is to make explicit references to files (i.e., file paths) relative to Windows "special folders."

For example, one such Windows "special folder" is the folder "Program Files." On typical English machines, this folder is located at "c:\Program Files." However, there is nothing that prevents users from storing it at "d:\Program Files." In addition, different languages often use different default locations such as "c:\Programme," which is used on German machines. FIG. 15 provides an exemplary mapping between Windows XP "special folders" installed on a typical English machine and folders in the filesystem configuration portion 204 of the application template 200.

Methods of replacing "special folders" with relative folders, such as those in the filesystem configuration portion 204 of the application template 200 are well known in the art and will not be described herein. However, file path references are often included in registry string values and/or datafiles, such as "*.ini files." For example, it is common in COM object registration to include the full file path to the COM object dll handler. An example COM registration is as follows: [HKCR\CLSID\{D5057FA3-045C-413B-A2F5-9C785BA55303}\InprocServer32]@="C:\Windows\system32\mscoree.dll"

In the above example COM registration, notice the hard-coded path "c:\windows\system32\mscoree.dll." If this path were to be left as-is, the path would not make sense on a Windows 2000 machine, which by default has its Windows directory set to "c:\winnt\." The naïve solution in this case is to perform a simple prefix string compare with the special paths from the computing device 16D used to capture the input configuration file 316A. However, there are a few things that interfere with this approach.

First, shortened or abbreviated filenames are often used in path strings. For example, a path might have the following format: "c:\Progra~1\Acme\Component.dll." In this case, one cannot simply do a prefix match with "c:\Program Files" to identify the folder replacement "@PROGRAMFILES@." Second, path values do not always start at the beginning of the registry string. A registry string might contain multiple paths or may have a proprietary layout. For example, a registry string may have the following format: "Handlers: c:\Program Files\Acme\Comp.dll, c:\Program Files\Acme\Bar.dll" Third, it is important to recognize the entire path value. Some applications enter case-sensitive paths into the registry. In order to support these applications one needs to recognize the entire path and test if it is all upper-case or all lower-case. A simple prefix match therefore does not work. Finally, Windows Installer based-paths may require special handling. Certain registry string values entered by the Windows Installer use a quotation mark '?' instead of the colon ':' after the drive letter.

Figure 16:
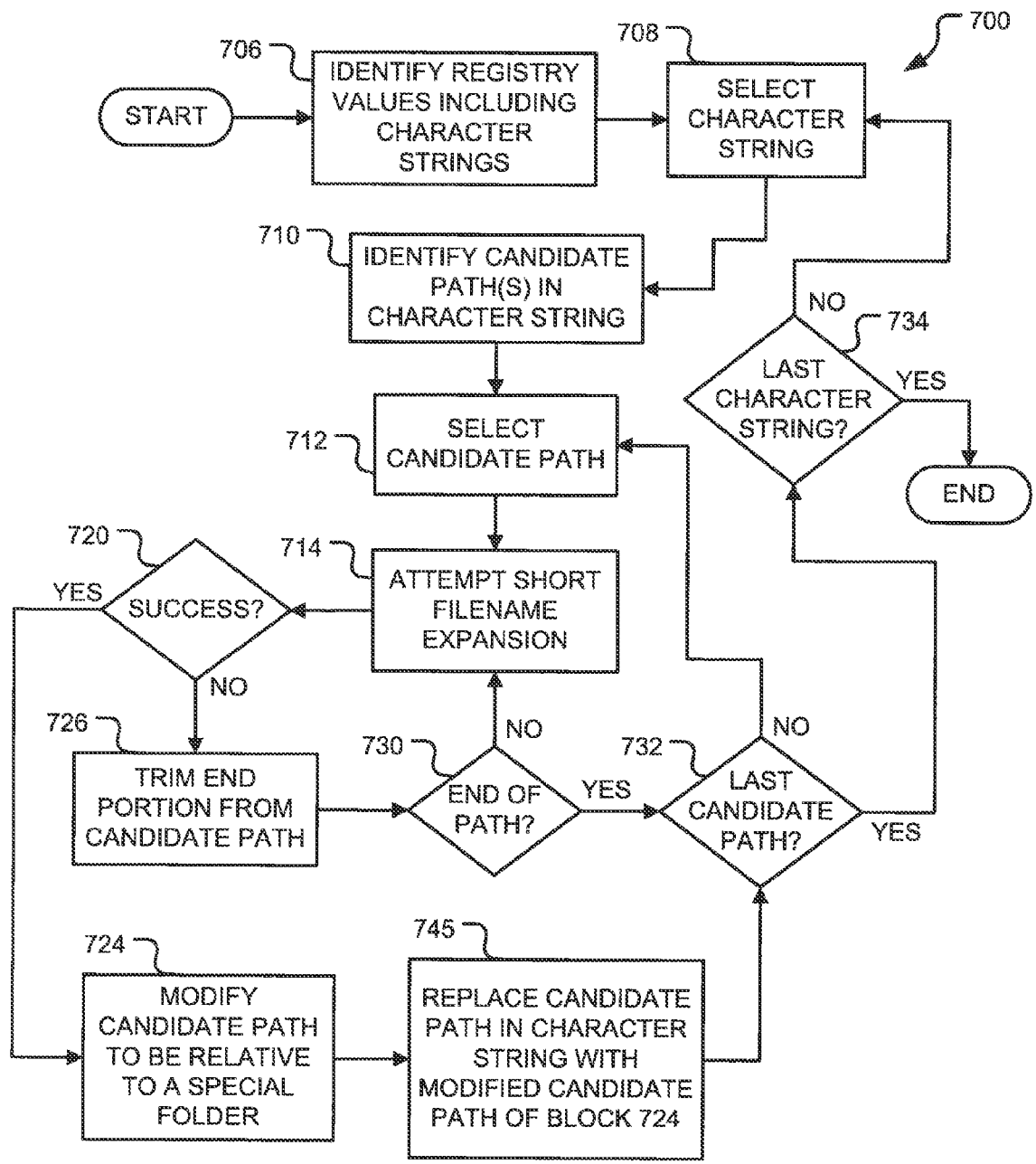
FIG. 16 is a method of modifying file paths found in registry entries to be relative to the special folders provided in FIG. 15.

FIG. 16 provides a method 700 that avoids the above problems. The method 700 implements a heuristic that uses a regular expression to locate candidate paths within registry string values. The regular expression may be characterized as a template. By way of a non-limiting example, the following regular expression may be used:

[a-zA-Z](:|\?)((\\)((?)[^,"|/><\t\*\?:])*)+

In first block 706, the registry values including a character string are identified. In next block 708, a character string is selected from one of the registry values identified in block 706. Then, in block 710, candidate paths within the character string are identified. This may be accomplished by comparing the regular expression to the registry values. In other words, any portions of the character string having the same form as the regular expression are identified as candidate paths in block 706.

In block 712, a candidate path is select. On the first iteration, the first candidate path identified in block 706 may be selected. In block 714, a short-filename expansion is attempted using the Win32 GetLongPathName API. This API will return success if the candidate path exists on the filesystem, which is generally the case because this processing occurs on the computing device 16D on which the input configuration file 316A was captured.

Decision block 720 determines whether the call to the GetLongPathName API was successful. If the decision in decision block 720 is "YES," the call was successful, and the method 700 advances to block 724. Otherwise, if the decision in decision block 720 is "NO," the call failed, and the method 700 advances to block 726.

If the call to the GetLongPathName API fails, there is a chance the regular expression match produced a candidate path having additional text (such as command line arguments) located at the end. For example, the following path includes additional text "-company acme" at its end:

"c:\Program Files\Acme\Component.dll-company acme." This is possible because specifying command line arguments is an ambiguous format that must be resolved by looking at the filesystem for existence.

In block 726, the candidate path is trimmed back to the last slash '\' or space. If the decision in decision block 730 is "YES," the path cannot be trimmed because the end of the path has been reached, and the method 700 advances to decision block 732. In decision block 732, whether the candidate path is the last one identified in the character string is decided. If the decision in decision block 732 is "YES," the method 700 advances to decision block 734. Otherwise, if the decision in decision block 732 is "NO," another candidate path is selected in block 712.

Decision block 734 determines whether all of the character strings identified in block 706 have been processed. If all of the character strings have been processed, the decision in block 734 is "YES," and the method 700 terminates. If at least one of the character string identified in block 706 needs processing, the decision in block 734 is "NO," and the method 700 returns to block 708.

If the decision in decision block 730 is "NO," the end of the path has not been reached, and block 714 calls GetLongPathName API with the trimmed candidate path. On each iteration, the candidate path is trimmed back to the last slash '\' or space and a new call is made to GetLongPathName API. Iteration continues on this candidate path until either the expansion works or no path remains.

In block 724, the expanded file path is known. In block 724, this path is modified to be relative to the Windows "Special Folders." Further, any portions trimmed from the end of the path may be appended thereto. A lookup table such as that depicted in FIG. 15 may be used to determine the appropriate special folder to use to modify the candidate path. In block 745, the candidate path in the character string selected in block 708 is replaced with the modified path from block 724. Then, the method 700 returns to decision block 732 to determine whether the candidate path is the last one.

Portions of the method 700 may be implemented using the following algorithm:

```
Replaced Reg Value = EmptyString // Start empty
For each PathCandidate in RegEx.Match(RegistryString)
    UnMatchedPortion = DetermineUnmatchedPortionBefore(PathCandidate)
    ReplacedRegValue.Append(UnMatchedPortion)
    RefinedCandidate = PathCandidate
    While(RefinedCandidate is not empty)
        If Succeeded(GetLongPathName(RefinedCandidate))
            // Record upper/lower case information
            // Record short-filename information
            ReplacedCandidate =
                ReplaceSpecialFolder(RefinedCandidate)
            ReplacedRegValue.Append(ReplacedCandidate)
            Break
        Else
            RefinedCandidate = RefinedCandidate.TrimToLast('\', ' ')
        End
    End
    // Append any portion previously excluded (such as arguments)
    ReplacedRegValue.Append(PathCandidate - RefinedCandidate)
End
UnMatchedPortion = DetermineUnmatchedPortionRemaining ( )
ReplacedRegValue.Append(UnMatchedPortion)
```

The method 700 is configured to locate and replace paths appearing in registry values. However, as is apparent to those of ordinary skill in the art, the method 700 may be modified or generalized to identify and replace paths in other data and settings repositories, such as "*.ini files."

Shims

Certain applications have trouble running properly virtualized. Often, this is indicative of a hole in the virtualization surface area or a bug in the virtualization runtime. On rare occasions, an application breaks in a way for which there is no general purpose solution. Sometimes an application will perform non-standard checks as to the state of a process such as for counter-debugging purposes, which might be altered when running virtualized. Other applications may depend on services that normally would run in an account having elevated privileges or access requirements. When such virtualized applications are executed in an end-user account, these applications may fail because the virtualized service does not have the proper permission to perform one or more actions.

In general, when a particular application breaks in ways that cannot be addressed in a general purpose way applicable for all applications, an application compatibility shim is required for that specific application. There are two main aspects to implementing a compatibility shim. The first aspect includes defining what kind of shim to use and how it should permute API behavior. The second aspect includes determining a way to recognize applications for which the shim should be activated.

As a general rule, a shim is given a name that corresponds to its behavior, such as "AllowAccessCheckToFail." As the name implies, this shim allows the AccessCheck API to fail—perhaps with a specific error code—and returns a success code.

Once the shim is defined, a system must be developed that recognizes applications and application states for which the shim must be activated. In other words, the virtualized application executable 140 includes a data structure associating one or more shims with one or more virtualized applications or processes implemented by the virtualized application executable 140. During execution, the virtual operating system 120 uses the data structure to determine which shims, if any, should be used with respect to a requested virtualized application or process. The virtualization runtime is configured to recognize when to activate each shim associated with a virtualized application or process. The virtualization runtime may include activation criteria for each shim that specifies under which circumstances the shim should be activated.

For example, the data structure may associate a shim "AllowOpenFileToFail" with a process "OpenFile API" that takes a string containing a file name as a parameter. The virtualization runtime may include a pattern matching algorithm that examines the file name in the input string and activates the shim when a match for the file name is not found in the virtualized application executable 140. If the file name corresponds to a file that must exist for the virtualized application 110 to execute, the shim "AllowOpenFileToFail" allows the application to execute without the file.

It may be desirable to incorporate two shims, a shim "CallFromKernel32Shim" and a shim "IgnoreSetAccessTokenFailureShim" in the virtualized application executable 140.

The shim "CallFromKernel32Shim" makes it appear to the virtualized application 110 that the caller to the application entry-point code was kernel32.dll. The shim "CallFromKernel32Shim" may be implemented for the Avant Browser application, which has a counter-debugging/security mechanism requiring the caller be the kernel32.dll. Normally un-virtualized applications always have their entry-point called by code within the kernel32.dll. When virtualized, the entry-point caller is not from within kernel32.

The shim "CallFromKernel32Shim" simply injects a method into an unused portion of the loaded kernel32.dll memory. The unused location in the kernel32.dll is located just beyond the Portable Executable ("PE") header information and is found by iterating the PE sections. The injected method calls the entry-point, which is passed as the only argument. By way of a non-limiting example, the method may be implemented using the following c++ code:

```
void NTAPI CallMethodInject(EntryPointFn pfn)
{
    pfn( );
}
```

The shim "CallFromKernel32Shim" is activated by simply looking at the name of the startup executable 160. If it matches avant.exe, the shim is enabled. Note, other information such as a publisher and version metadata information related to the startup executable 160 could be used to avoid unnecessarily turning on the shim "CallFromKernel32Shim." When this shim "CallFromKernel32Shim" is enabled, instead of calling the application entry point directly as would normally be done, the injected code is called passing the application entry point as the parameter. The kernel32.dll then calls the application entry point. In this manner, the call appears to have originated from the kernel32.dll.

The shim "IgnoreSetAccessTokenFailureShim" may be used for SQL Server Express running on Windows 2000. When used with "User instances" the SQL Service launches a child process running as a user account. When the main service runs virtually, it is already running as a user account. When the main service calls the NtSetInformationProcess API, setting the access token fails with a "privilege-not-held" type error.

The shim "IgnoreSetAccessTokenFailureShim" checks for the following conditions:
1. Is virtualized SQL Server Express running on Windows 2000?
2. Is the access token being set?
3. Is the process name "sqlserver.exe?"
4. Is the error code "Privilege not held"?

If all of the above conditions are satisfied, the shim "IgnoreSetAccessTokenFailureShim" converts the error to a success code. While the parent service process is running as the end-user, the child process will also run as an end user and the user instance is able to start and work correctly.

Initialization Phase

During the initialization phase of the virtualization runtime, the virtual application configuration data block 121 is read. The configuration data block 121 may be stored in a serialized binary format for efficiency. First, basic application metadata and settings are read. For example, the application name, application version, and sandbox location may be read first.

As mentioned above, the configuration data block 121 also provides isolation information to the virtual operating system 120. This information indicates which files, registry entries, environment variables, and services are to be isolated from the host operating system 35.

Next, the virtualization runtime reads the virtual layers (e.g., the virtual layers 208A and 208B illustrated in FIG. 5) from the configuration data block 121. Each virtual layer identifies files, registry entries, environment variables, and services. As the virtual layers are read, the corresponding files, registry entries, environment variables, and services are added to appropriate runtime data-structures. For files and registry entries, the runtime data-structures may be implemented as search-trees, similar to those used in the host filesystem 126 and the host registry 128. The environment variables and services may be implemented as a flat set.

When a conditional layer (e.g., the virtual layer 208B) is encountered, the condition specified by the layer is evaluated against the host operating system 35. If the condition evaluates to "TRUE," the layer is processed as normal (i.e., the files, registry entries, environment variables, and services identified by the layer are added to the appropriate runtime data-structures). If the condition evaluates to "FALSE," the layer is not added to the runtime data-structures.

After initialization, the appropriate startup executable(s) 160 is/are launched inside the virtual operating system 120. The virtual operating system 120 intercepts calls to the host operating system 35 and routes them to corresponding components of the virtual operating system 120. For example, when the virtualized application 110 requests access an application file using a path of a natively installed version of the application, the virtual operating system 120 intercepts the request and routes the request to the block of data in the virtualized application executable 140 corresponding to the application file requested. When the virtual operating system 120 needs to create, modify, or delete an application file, the virtual operating system 120 does so in the sandbox. The virtual operating system 120 may also route some requests and actions to the host operating system 35 for processing.

Identifying the Bootstrap Process

When implementing an application virtualization runtime, one must consider that many applications include multiple processes executing simultaneously or serially. For example, processes may be created for COM Servers, help viewers, on-the-fly compilation (as required by .NET serialization), virtualized services, and so on. To perform one-time runtime initialization, implement correct behavior of multi-process APIs, and improve resource utilization within the virtualized application processes, it is necessary to coordinate the virtualization runtimes across these various processes.

There are a few tasks that need to be performed only once during the execution of the virtualized application executable 140. These tasks include performing a license check, displaying branding, executing the processes related to the bootstrap process (e.g., the "shotgun" launching of startup processes), and auto-starting any auto-start virtual services. To perform these one-time tasks only once, the runtime of the virtualized application executable 140 needs to know whether the currently running instance of the virtualized application executable 140 is the first process (also referred to as the bootstrap process).

When a process (bootstrap or child) is started from within the virtualized environment, a process data structure is allocated in shared memory and populated with information. By way of a non-limiting example, the process data structure may be implemented using the following exemplary data structure:

```
struct SVirtualizedProcessInfo
{
    ULONG cDepth;
    WCHAR awcsBootstrapPath[MAX_PATH+1];
    WCHAR awcsCurrentDirectory[MAX_PATH+1];
};
```

When an instance of the virtualized application executable 140 is executed, the above data structure is created. Thus, this data structure is created by the bootstrap process. Early in the execution of the runtime for the virtualized application executable 140, the application looks for the presence of this process data structure in shared memory using the name "_xvm_mem_[processId]_[isolation#]," where the parameter "processId" is a process identifier provided by a GetCurrentProcessId( ) API and the parameter "isolation#" is provided by the configuration data block 121. By way of a non-limiting example, the parameter "isolation#" may be a MD5 has of the path of the sandbox. As mentioned above, data cannot be written to the virtualized application executable 140. However, data may be written to the sandbox at a location specified in the configuration data block 121.

If the process data structure is not found, the process executing is the first process (or bootstrap process) and the additional one-time initialization processes (or tasks) can be performed. If the process data structure is found, the process executing is not the first process within the virtualized application executable 140.

Coordination Between Virtualized Processes

Virtualizing certain windows APIs requires coordination between multiple processes within the virtualized application 110. Examples of APIs that require coordination within the virtualization runtime are Windows Services APIs implemented by the virtualized application executable 140. Calls made to the Windows Services APIs by the virtualized application 110 are intercepted and implemented within the virtualization runtime.

Each Windows Service API involves a separate process, namely the Windows service the API implements. Further, an additional implicit process is involved, the Windows Service Control Manager ("SCM"). When virtualizing these APIs, the SCM is virtualized using shared objects and memory on a per-service basis.

For each service, the following structure is allocated in shared memory by the bootstrap process.

```
#define MAX_CONTROL_REQUESTS 100
#define MAX_SERVICE_ARGS 5
typedef struct _SServiceState
{
  // Service state
  DWORD CurrentState;
  DWORD ControlsAccepted;
  DWORD Win32ExitCode;
  DWORD ServiceSpecificExitCode;
  DWORD CheckPoint;
  DWORD WaitHint;
  // Startup info
  ULONG CountArgs;
  WCHAR Args[MAX_SERVICE_ARGS][MAX_PATH];
  // Control information
  ULONG ControlRequestCount;
  DWORD ControlRequests[MAX_CONTROL_REQUESTS];
} SServiceState;
```

The shared memory allocated is given the name "_xvm_mem_[service name]_[isolation#]" and contains basic fields used to keep track of Windows Services. The parameter "service name" identifies the service requested. As discussed above, the parameter "isolation#" is provided by the configuration data block 121.

In addition, a named event and mutex are created to coordinate Service APIs for shutdown, startup, and service control requests. These are named "_xvm_evt_[service name]_[isolation#]" and "_xvm_mtx[service name]_[isolation#]," respectively. The shared memory is updated in response to calls to the virtualized SCM APIs, while the event and mutex are used to maintain consistency of the data via standard multi-threading techniques.

One area where resource utilization can suffer a great deal in virtualized applications as compared to the same non-virtualized application is in the sharing of file data between processes. In non-virtualized applications, all application files are physically installed on the host filesystem 126 of the host computing device 12. When multiple processes within the application request the same file data, optimized memory management in Windows allocates physical pages only once per file. This optimization is lost when accessing files virtually across multiple processes.

To mitigate this loss, file data may be decompresses into shared memory for files that consume at least one page of memory. The name used for the shared memory for these files is "_xvm_mem_[file hash]_[isolation#]." The file name may be hashed to create the parameter "file hash" of the name, which operates as file identifier. Any suitable hash method may be used including MD5, and the like.

When a virtualized process requests data from a file, via either NtReadFile or NtMapViewOfSection, it first looks up this shared memory. If it is found, that memory can be used directly as it is guaranteed to already be populated. Otherwise, under standard locking, the process allocates the shared memory and decompresses the file data into the memory, making it available for subsequent access by this and other processes.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method of executing one or more virtual applications from a single executable file on a computing device, the computing device storing software components accessible by other processes executing on the computing device, the software components being identified in a manifest including a public key token associated with the software components, the manifest being configured to receive calls to the software components and direct them to the software components, the method comprising:
   receiving, by the computing device, a character string comprising a parameter and an identification of an executable file implementing a plurality of virtual applications, the executable file comprising a plurality of startup files each corresponding to one of the plurality of virtual applications;
   executing, by the computing device, a process of the executable file;
   determining, by the computing device, whether the executing process is a first process of the executable file to be executed based on the presence or absence of a data structure associated with the executable file in a shared memory;
   allocating, by the computing device, a data structure in a shared memory associated with the executing process;
   parsing, by the computing device, the character string to obtain the parameter;
   identifying, by the computing device, which of the plurality of startup files to execute based on the parameter;
   executing, by the computing device, the identified startup file to thereby execute at least a particular one of the plurality of virtual applications, the particular virtual application being isolated from the other processes executing on the computing device;
   creating, by the computing device, a private memory cache for the particular virtual application;
   storing, by the computing device, copies of the software components in the private memory cache;
   mapping a location on the computing device in which the software components are stored to a location in the private memory cache in which the copies of the software components are stored;
   receiving a request from the particular virtual application for the location on the computing device in which the software components are stored;
   intercepting the request;
   after intercepting the request, returning the location on the computing device in which the software components are stored instead of the location in the private memory cache in which the copies of the software components are stored;
   creating a private copy of the manifest, the private copy of the manifest omitting the public key token associated with the software components, the private copy of the manifest being configured to direct calls to the software components to the copies of the software components stored in the private memory cache;
   intercepting calls by the particular virtual application to the software components; and
   directing the intercepted calls to the private copy of the manifest.

2. The method of claim 1, further comprising, when the executing process is determined to be the first process of the executable file to be executed:
   identifying one or more additional startup files to be executed; and
   executing the one or more additional startup files.

3. A non-transitory computer-readable medium comprising instructions that when executed by one or more processors of a computing device perform a method of executing one or more virtual applications from a single executable file, the computing device storing software components accessible by other processes executing on the computing device, the software components being identified in a manifest including a public key token associated with the software components, the manifest being configured to receive calls to the software components and direct them to the software components, the method comprising:
   receiving a character string comprising a parameter and an identification of an executable file implementing a plurality of virtual applications, the executable file comprising a plurality of startup files each corresponding to one of the plurality of virtual applications;
   executing a process of the executable file;
   determining whether the executing process is a first process of the executable file to be executed based on the presence or absence of a data structure associated with the executable file in a shared memory;
   allocating a data structure in a shared memory associated with the executing process;
   parsing the character string to obtain the parameter;
   identifying which of the plurality of startup files to execute based on the parameter; and
   executing the identified startup file to thereby execute at least a particular one of the plurality of virtual applications, the particular virtual application being isolated from the other processes executing on the computing device;
   creating a private memory cache for the particular virtual application;
   storing copies of the software components in the private memory cache;
   mapping a location on the computing device in which the software components are stored to a location in the private memory cache in which the copies of the software components are stored;
   receiving a request from the particular virtual application for the location on the computing device in which the software components are stored;
   intercepting the request;
   after intercepting the request, returning the location on the computing device in which the software components are stored instead of the location in the private memory cache in which the copies of the software components are stored;
   creating a private copy of the manifest, the private copy of the manifest omitting the public key token associated with the software components, the private copy of the manifest being configured to direct calls to the software components to the copies of the software components stored in the private memory cache;
   intercepting calls by the particular virtual application to the software components; and
   directing the intercepted calls to the private copy of the manifest.

4. A method of incorporating software components into a virtual application isolated from other processes executing on a computing device, the software components being accessible by the other processes executing on the computing device, the software components being identified in a manifest including a public key token associated with the software components, the manifest being configured to receive calls to the software components and direct them to the software components, the method comprising:
- creating a private memory cache for the virtual application;
- storing copies of the software components in the private memory cache;
- mapping a location on the computing device in which the software components are stored to a location in the private memory cache in which the copies of the software components are stored;
- receiving a request from the virtual application for the location on the computing device in which the software components are stored;
- intercepting the request;
- after intercepting the request, returning the location on the computing device in which the software components are stored instead of the location in the private memory cache in which the copies of the software components are stored;
- creating a private copy of the manifest, the private copy of the manifest omitting the public key token associated with the software components, the private copy of the manifest being configured to direct calls to the software components to the copies of the software components stored in the private memory cache;
- intercepting calls by the virtual application to the software components; and
- directing the intercepted calls to the private copy of the manifest.

5. The method of claim 4, wherein the request is a first request, and the method further comprises:
- mapping a location on the computing device in which the manifest is stored to a location in which the private copy of the manifest is stored;
- receiving a second request from the virtual application for the location on the computing device in which the manifest is stored;
- intercepting the second request; and
- after intercepting the second request, returning the location on the computing device in which the manifest is stored instead of the location in which the private copy of the manifest is stored.

6. The non-transitory computer-readable medium of claim 5, wherein the request is a first request, and the method further comprises:
- mapping a location on the computing device in which the manifest is stored to a location in which the private copy of the manifest is stored;
- receiving a second request from the virtual application for the location on the computing device in which the manifest is stored;
- intercepting the second request; and
- after intercepting the second request, returning the location on the computing device in which the manifest is stored instead of the location in which the private copy of the manifest is stored.

7. A non-transitory computer-readable medium comprising instructions that when executed by one or more processors of a computing device perform a method of incorporating software components into a virtual application isolated from other processes executing on the computing device, the software components being accessible by the other processes executing on the computing device, the software components being identified in a manifest including a public key token associated with the software components, the manifest being configured to receive calls to the software components and direct them to the software components, the method comprising:
- creating a private memory cache for the virtual application;
- storing copies of the software components in the private memory cache;
- mapping a location on the computing device in which the software components are stored to a location in the private memory cache in which the copies of the software components are stored;
- receiving a request from the virtual application for the location on the computing device in which the software components are stored;
- intercepting the request;
- after intercepting the request, returning the location on the computing device in which the software components are stored instead of the location in the private memory cache in which the copies of the software components are stored;
- creating a private copy of the manifest, the private copy of the manifest omitting the public key token associated with the software components, the private copy of the manifest being configured to direct calls to the software components to the copies of the software components stored in the private memory cache;
- intercepting calls by the virtual application to the software components; and
- directing the intercepted calls to the private copy of the manifest.

\* \* \* \* \*